US009516440B2

(12) United States Patent
Jarvis et al.

(10) Patent No.: US 9,516,440 B2
(45) Date of Patent: Dec. 6, 2016

(54) PROVIDING A MULTI-CHANNEL AND A MULTI-ZONE AUDIO ENVIRONMENT

(71) Applicant: Sonos, Inc., Santa Barbara, CA (US)

(72) Inventors: Simon Jarvis, Cambridge, MA (US); Hilmar Lehnert, Framinghman, MA (US); Aurelio Rafael Ramos, Cambridge, MA (US); Luis Vega, Cambridge, MA (US)

(73) Assignee: Sonos, Santa Barbara, CA (US)

( * ) Notice: Subject to any disclaimer, the term of this patent is extended or adjusted under 35 U.S.C. 154(b) by 205 days.

(21) Appl. No.: 13/632,731

(22) Filed: Oct. 1, 2012

(65) Prior Publication Data
US 2014/0093085 A1  Apr. 3, 2014

(51) Int. Cl.
H04R 27/00 (2006.01)
H04S 3/00 (2006.01)
H04J 3/06 (2006.01)

(52) U.S. Cl.
CPC .............. *H04R 27/00* (2013.01); *H04J 3/062* (2013.01); *H04J 3/0638* (2013.01); *H04J 3/0664* (2013.01); *H04R 2227/003* (2013.01); *H04R 2227/005* (2013.01); *H04R 2420/07* (2013.01); *H04S 3/008* (2013.01)

(58) Field of Classification Search
CPC ......... H04R 3/12; H04R 27/00; H04R 29/002; H04R 2227/003; H04R 2227/005; H04R 2420/07; H04S 3/008; H04J 3/062; H04J 3/0664; H04J 3/0638
USPC ........................................ 381/17, 59, 80, 81
See application file for complete search history.

(56) References Cited

U.S. PATENT DOCUMENTS

| 5,923,902 | A | 7/1999 | Inagaki |
| 6,256,554 | B1 | 7/2001 | DiLorenzo |
| 6,404,811 | B1 | 6/2002 | Cvetko et al. |
| 6,522,886 | B1 | 2/2003 | Youngs et al. |
| 6,611,537 | B1 | 8/2003 | Edens et al. |

(Continued)

FOREIGN PATENT DOCUMENTS

| EP | 2485504 A1 | 8/2012 |
| GB | 2486183 | 6/2012 |

(Continued)

OTHER PUBLICATIONS

International Bureau, "Search Report", issued in connection with International application No. PCT/US2013/061124, mailed on Jan. 22, 2014, 5 pages.

(Continued)

*Primary Examiner* — Davetta W Goins
*Assistant Examiner* — Daniel Sellers
(74) *Attorney, Agent, or Firm* — McDonnell Boehnen Hulbert & Berghoff LLP

(57) ABSTRACT

A multi-channel and multi-zone audio environment is provided. Various inventions are disclosed that allow playback devices on one or more networks to provide an effective multi-channel and a multi-zone audio environment using timing information. According to one example, timing information is used to coordinate playback devices connected over a low-latency network to provide audio along with a video display. In another example, timing information is used to coordinate playback devices connected over a mesh network to provide audio in one or more zones or zone groups.

31 Claims, 14 Drawing Sheets

(56) References Cited

U.S. PATENT DOCUMENTS

| | | |
|---|---|---|
| 6,631,410 B1 | 10/2003 | Kowalski et al. |
| 6,757,517 B2 | 6/2004 | Chang |
| 6,778,869 B2 | 8/2004 | Champion |
| 6,934,752 B1 * | 8/2005 | Gubbi .......................... 709/225 |
| 7,130,608 B2 | 10/2006 | Hollstrom et al. |
| 7,130,616 B2 | 10/2006 | Janik |
| 7,143,939 B2 | 12/2006 | Henzerling |
| 7,158,488 B2 | 1/2007 | Fujimori |
| 7,236,773 B2 | 6/2007 | Thomas |
| 7,330,552 B1 | 2/2008 | LaMance |
| 7,474,677 B2 | 1/2009 | Trott |
| 7,483,538 B2 | 1/2009 | McCarty et al. |
| 7,571,014 B1 | 8/2009 | Lambourne et al. |
| 7,631,119 B2 | 12/2009 | Moore et al. |
| 7,643,894 B2 | 1/2010 | Braithwaite et al. |
| 7,657,910 B1 | 2/2010 | McAulay et al. |
| 7,669,113 B1 | 2/2010 | Moore et al. |
| 7,765,315 B2 | 7/2010 | Batson et al. |
| 7,805,210 B2 * | 9/2010 | Cucos et al. ................... 700/94 |
| 7,853,341 B2 | 12/2010 | McCarty et al. |
| 8,014,423 B2 | 9/2011 | Thaler et al. |
| 8,015,306 B2 | 9/2011 | Bowman |
| 8,045,952 B2 | 10/2011 | Qureshey et al. |
| 8,103,009 B2 | 1/2012 | McCarty et al. |
| 8,185,674 B2 | 5/2012 | Moore et al. |
| 8,208,653 B2 | 6/2012 | Eo et al. |
| 8,233,648 B2 | 7/2012 | Sorek et al. |
| 8,234,395 B2 | 7/2012 | Millington |
| 8,239,748 B1 | 8/2012 | Moore et al. |
| 8,316,147 B2 | 11/2012 | Batson et al. |
| 8,320,824 B2 * | 11/2012 | Banks et al. ................. 455/3.06 |
| 8,340,330 B2 | 12/2012 | Yoon et al. |
| 8,345,709 B2 | 1/2013 | Nitzpon et al. |
| 8,432,851 B2 | 4/2013 | Xu et al. |
| 8,457,334 B2 | 6/2013 | Yoon et al. |
| 8,463,875 B2 | 6/2013 | Katz et al. |
| 8,509,211 B2 | 8/2013 | Trotter et al. |
| 8,520,870 B2 | 8/2013 | Sato et al. |
| 8,615,091 B2 | 12/2013 | Terwal |
| 8,639,830 B2 | 1/2014 | Bowman |
| 8,683,009 B2 | 3/2014 | Ng et al. |
| 8,750,282 B2 | 6/2014 | Gelter et al. |
| 8,751,026 B2 | 6/2014 | Sato et al. |
| 8,904,066 B2 | 12/2014 | Moore et al. |
| 8,930,006 B2 | 1/2015 | Haatainen |
| 2001/0042107 A1 | 11/2001 | Palm |
| 2002/0022453 A1 | 2/2002 | Balog |
| 2002/0026442 A1 | 2/2002 | Lipscomb |
| 2002/0124097 A1 * | 9/2002 | Isely et al. .................... 709/231 |
| 2003/0157951 A1 | 8/2003 | Hasty, Jr. |
| 2004/0024478 A1 | 2/2004 | Hans |
| 2007/0038999 A1 * | 2/2007 | Millington .................... 718/100 |
| 2007/0142944 A1 | 6/2007 | Goldberg |
| 2007/0214229 A1 * | 9/2007 | Millington .............. H04L 69/28 709/208 |
| 2008/0212786 A1 | 9/2008 | Park |
| 2009/0100189 A1 | 4/2009 | Bahren et al. |
| 2009/0192638 A1 | 7/2009 | Van et al. |
| 2009/0298420 A1 | 12/2009 | Haartsen et al. |
| 2011/0007745 A1 | 1/2011 | Schultz et al. |
| 2011/0015769 A1 * | 1/2011 | Haatainen ...................... 700/94 |
| 2011/0145859 A1 | 6/2011 | Novack et al. |
| 2012/0237054 A1 | 9/2012 | Eo et al. |
| 2013/0038726 A1 | 2/2013 | Kim |
| 2013/0170647 A1 * | 7/2013 | Reilly et al. .................... 381/17 |
| 2013/0201907 A1 * | 8/2013 | Chen et al. ................... 370/328 |
| 2013/0336499 A1 * | 12/2013 | Beckhardt .............. H04R 27/00 381/81 |
| 2014/0323036 A1 | 10/2014 | Daley et al. |
| 2015/0049248 A1 | 2/2015 | Wang et al. |
| 2015/0098576 A1 | 4/2015 | Sundaresan et al. |

FOREIGN PATENT DOCUMENTS

| | | |
|---|---|---|
| KR | 20070104161 A | 10/2007 |
| WO | 0153994 | 7/2001 |

OTHER PUBLICATIONS

International Bureau, "Written Opinion", issued in connection with International application No. PCT/US2013/061124, mailed on Jan. 22, 2014, 4 pages.

Voyetra Turtle Beach, Inc., "AudioTron Quick Start Guide, Version 1.0", Mar. 2001, 24 pages.

Voyetra Turtle Beach, Inc., "AudioTron Reference Manual, Version 3.0", May 2002, 70 pages.

Voyetra Turtle Beach, Inc., "AudioTron Setup Guide, Version 3.0", May 2002, 38 pages.

Bluetooth, "Specification of the Bluetooth System: The ad hoc SCATTERNET for affordable and highly functional wireless connectivity" Core, Version 1.0 A, Jul. 26, 1999, 1068 pages.(Document uploaded in 7 different files: NPL4_part1 pp. 1 to 150, NPL4_part2 pp. 151 to 300, NPL4_part3 pp. 301 to 450, NPL4_part4 pp. 451 to 600,NPL4_part5 pp. 601 to 750, NPL4_part6 pp. 751 to 900 and NPL4_part7 pp. 901 to 1068).

Bluetooth. "Specification of the Bluetooth System: Wireless connections made easy" Core, Version 1.0 B, Dec. 1, 1999, 1081 pages.(Document uploaded in 8 different files: NPL5_part1 pp. 1 to 150, NPL5_part2 pp. 151 to 303, NPL5_part3 pp. 304 to 453, NPL5_part4 pp. 454 to 603,NPL5_part5 pp. 604 to 703, NPL5_part6 pp. 704 to 854 and NPL5_part7 pp. 855 to 1005, NPL5_part8 pp. 1006 to 1081).

Dell, Inc., "Dell Digital Audio Receiver: Reference Guide", Jun. 2000, 70 pages.

Dell, Inc., "Start Here", Jun. 2000, 2 pages.

Jo J., et al., "Synchronized One-to-many Media Streaming with Adaptive Playout Control", Proceedings of SPIE, 2002, vol. 4861, pp. 71-82.

Jones, Stephen, "Dell Digital Audio Receiver: Digital upgrade for your analog stereo" Analog Stereo, Jun. 24, 2000 < http://www.reviewsonline.com/articles/961906864.htm> retrieved Jun. 18, 2014, 2 pages.

Louderback, Jim, "Affordable Audio Receiver Furnishes Homes With MP3",TechTV Vault, Jun. 28, 2000 <http://www.g4tv.com/articles/17923/affordable-audio-receiver-furnishes-homes-with-mp3/> retrieved Jul. 10, 2014, 2 pages.

Palm, Inc., "Handbook for the Palm VII Handheld", May 2000, 311 pages.

Microsoft Corp., "Universal Plug and Play Device Architecture", Jun. 8, 2000, version 1.0, pp. 1-54.

Higgins et al., "Presentations at WinHEC 2000" May 2000, 138 pages.

International Bureau, "International Preliminary Report on Patentability", issued in connection with PCT patent application No. PCT/US2013/061124, issued on Apr. 7, 2015, 5 pages.

European Extended Search Report for Application No. 13844284.3 mailed on Aug. 27, 2015, 7 pages.

European Patent Office, European Search Report mailed on May 30, 2016, issued in connection with Application No. 13844284.3, 4 pages.

* cited by examiner

PROVIDING A MULTI-CHANNEL AND A MULTI-ZONE AUDIO ENVIRONMENT

FIELD OF THE DISCLOSURE

The disclosure is related to consumer goods and, more particularly, to systems, products, features, services, and other items directed to media playback or some aspect thereof.

BACKGROUND

Technological advancements have increased the accessibility of music content, as well as other types of media, such as television content, movies, and interactive content. For example, a user can access audio, video, or both audio and video content over the Internet through an online store, an Internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology are better understood with regard to the following description, appended claims, and accompanying drawings where:

Figure 1:
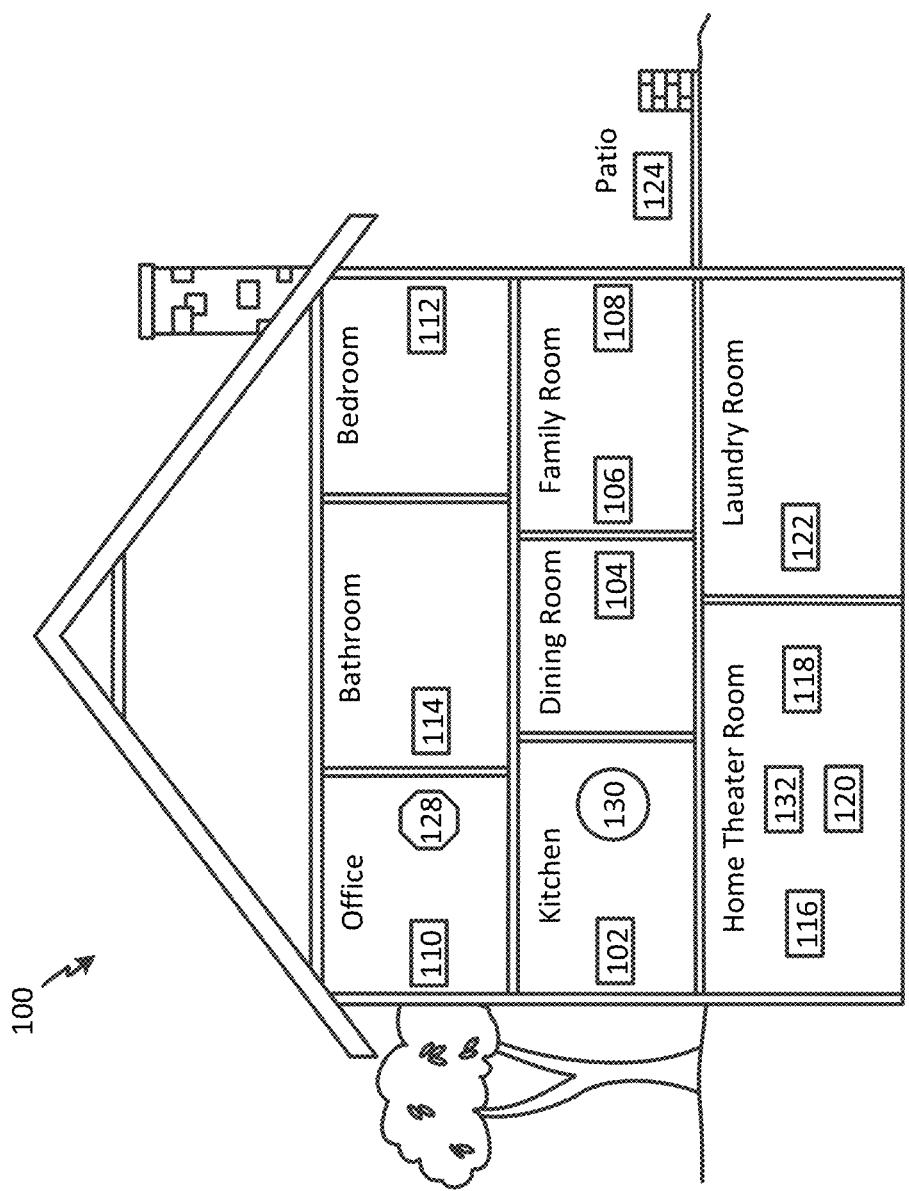
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments disclosed herein enable coordinated playback amongst players for use in a home theater environment, a zone group environment, or both. Particularly, the embodiments provide for the distribution of audio information that corresponds to video.

Certain embodiments provide one or more methods, systems, apparatus, and/or machine-readable mediums to distribute audio information, such as audio information that corresponds to video.

Certain embodiments provide a method to distribute audio information. The example method includes receiving an audio signal at a first device from an audio source. The example method includes identifying home theater audio information contained in the audio signal for playback by a plurality of home theater players. The example method includes identifying zone group audio information contained in the audio signal for playback by one or more players in a zone group. The example method includes assigning one or more timestamps to home theater audio information that indicates a time at which audio is to be played by the plurality of home theater players. The example method includes assigning a zone group timestamp to the zone group audio information that indicates a time at which audio is to be played by the one or more players in the zone group. The example method includes sending, from the first device, the home theater audio information with the one or more timestamps to the plurality of home theater players and sending the zone group audio information with the zone group timestamp to the one or more players in the zone group.

Certain embodiments provide a tangible machine-readable medium having instructions stored thereon that, when executed, cause a machine to at least receive an audio signal at a first device from an audio source. The example instructions cause the machine to at least identify home theater audio information contained in the audio signal for playback by a plurality of home theater players. The example instructions cause the machine to at least identify zone group audio information contained in the audio signal for playback by one or more players in a zone group. The example instructions cause the machine to at least assign one or more timestamps to home theater audio information that indicates a time at which audio is to be played by the plurality of home theater players. The example instructions cause the machine to at least assign a zone group timestamp to the zone group audio information that indicates a time at which audio is to be played by the one or more players in the zone group. The example instructions cause the machine to at least send, from the first device, the home theater audio information with the one or more timestamps to the plurality of home theater players and sending the zone group audio information with the zone group timestamp to the one or more players in the zone group.

II. An Example Operating Environment

Referring now to the drawings, in which like numerals can refer to like parts throughout the figures, FIG. 1 shows an example system configuration 100 in which one or more embodiments disclosed herein can be practiced or implemented.

By way of illustration, the system configuration 100 represents a home with multiple zones, though the home could have been configured with only one zone. Each zone, for example, may represent a different room or space, such as an office, bathroom, bedroom, kitchen, dining room, family room, home theater room, utility or laundry room, and patio. A zone may also include an area inside a home, building, or vehicle or outside and as such may include any spatial area. A single zone might also include multiple rooms or spaces if so configured. One or more of zone players 102-124 are shown in each respective zone. A zone player 102-124, also referred to herein as a playback device, multimedia unit, speaker, player, and so on, provides audio, video, and/or audiovisual output. A controller 130 (e.g., shown in the kitchen for purposes of illustration) provides control to the system configuration 100. Controller 130 may be fixed to a zone, or alternatively, mobile such that it can be moved about the zones. The system configuration 100 may also include more than one controller 130. The system configuration 100 illustrates an example whole house audio system, though it is understood that the technology described herein is not limited to its particular place of application or to an expansive system like a whole house audio system 100 of FIG. 1.

a. Example Zone Players

Figure 2A:
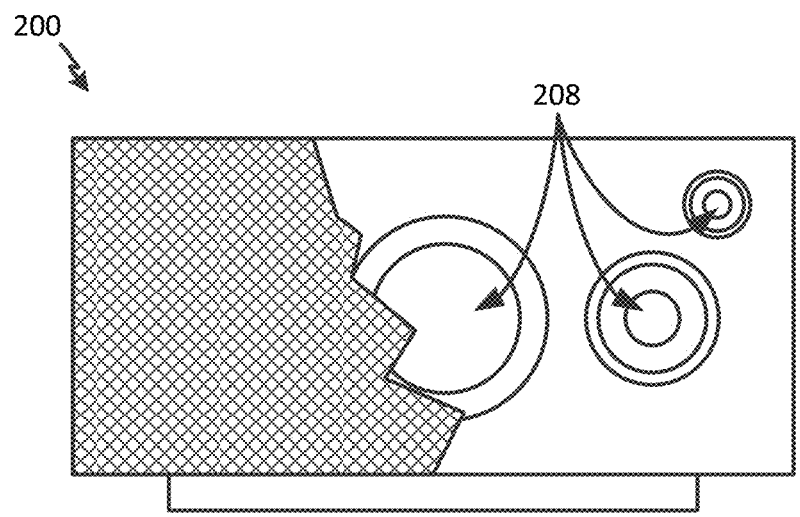
FIG. 2A shows an illustration of an example zone player having a built-in amplifier and transducers.
Figure 2B:
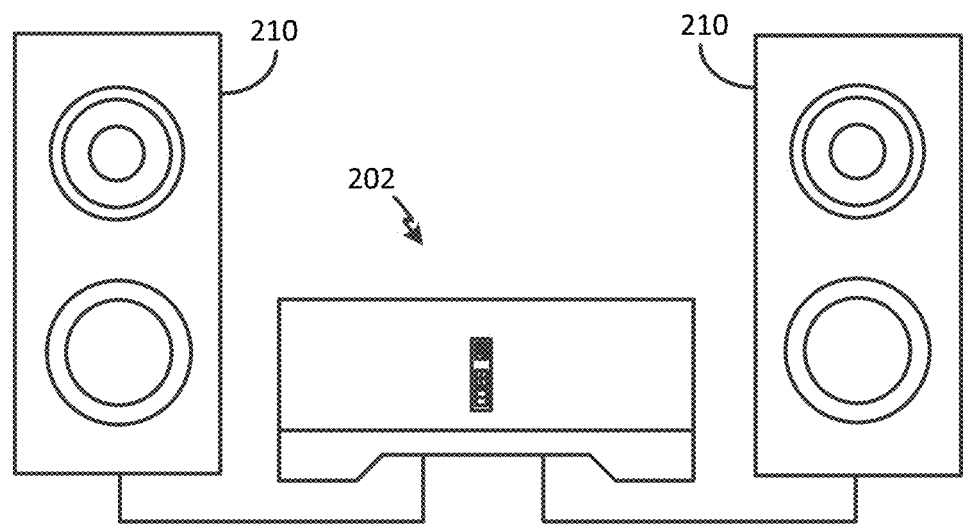
FIG. 2B shows an illustration of an example zone player having a built-in amplifier and connected to external speakers.
Figure 2C:
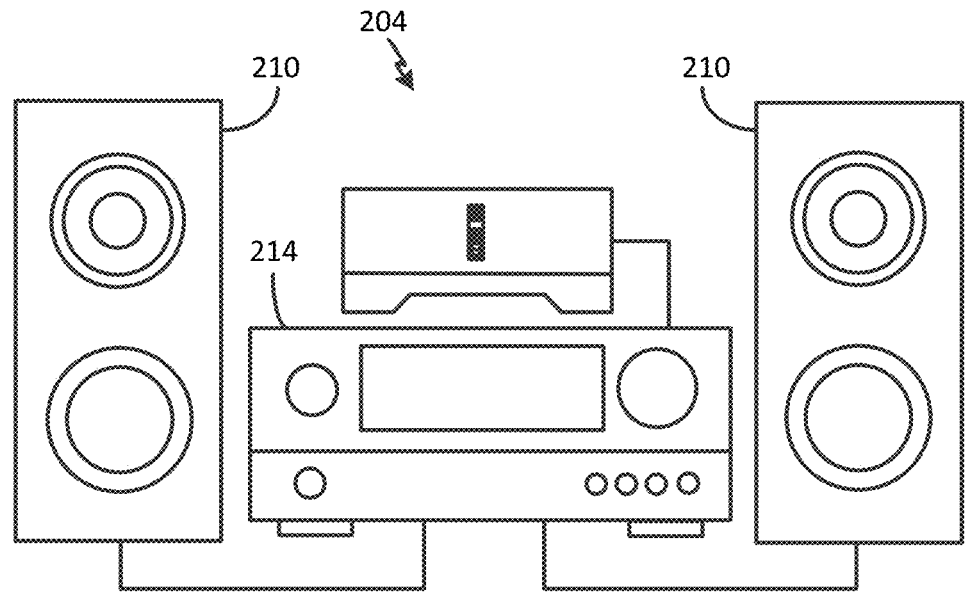
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played (also referred to herein as a "playback queue"). Each item in the queue may comprise a uniform resource identifier (URI) or some other identifier. The URI or identifier can point the zone player to the audio source. The audio source might be found on the Internet (e.g., the cloud), locally from another device over data network 128 (described further below), from the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, Calif. presently offers for sale zone players currently referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player can include or interact with a docking station for an Apple IPOD™ or similar device.

b. Example Controllers

Figure 3:
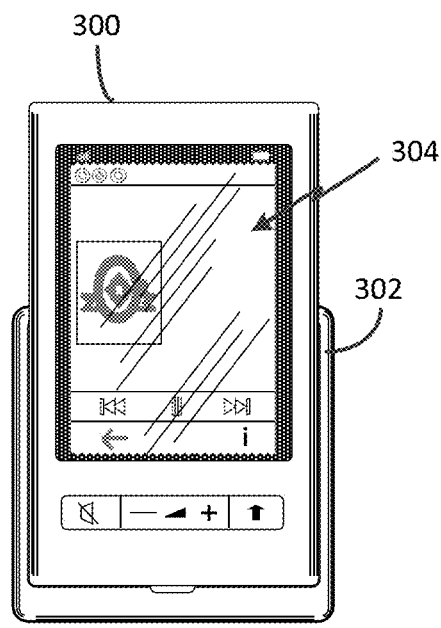
FIG. 3 shows an illustration of an example controller.

FIG. 3 illustrates an example wireless controller 300 in docking station 302. By way of illustration, controller 300 can correspond to controlling device 130 of FIG. 1. Docking station 302, if provided, may be used to charge a battery of controller 300. In some embodiments, controller 300 is provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there can be a limit set on the number of controllers that can control the system configuration 100. The controllers might be wireless like wireless controller 300 or wired to data network 128.

In some embodiments, if more than one controller is used in system 100, then each controller may be coordinated to display common content, and may all be dynamically updated to indicate changes made from a single controller. Coordination can occur, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE®, IPAD®, ANDROID™ powered phone, or any other smart phone or network-enabled device can be used as controller 130. An application running on a laptop or desktop personal computer (PC) or MAC® can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for IPHONE®," "SONOS® Controller for IPAD®," "SONOS® Controller for ANDROID™," "SONOS® Controller for MAC® or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and a played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Example Zone Players

Figure 4:
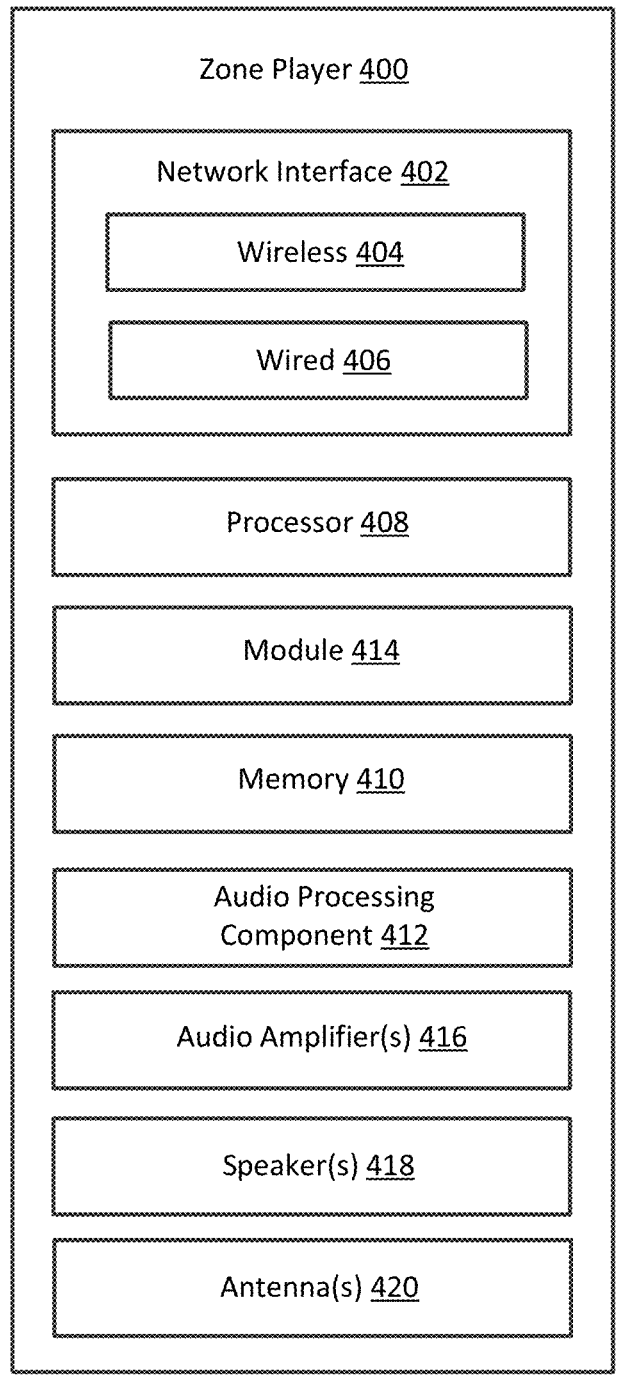
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY: 5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
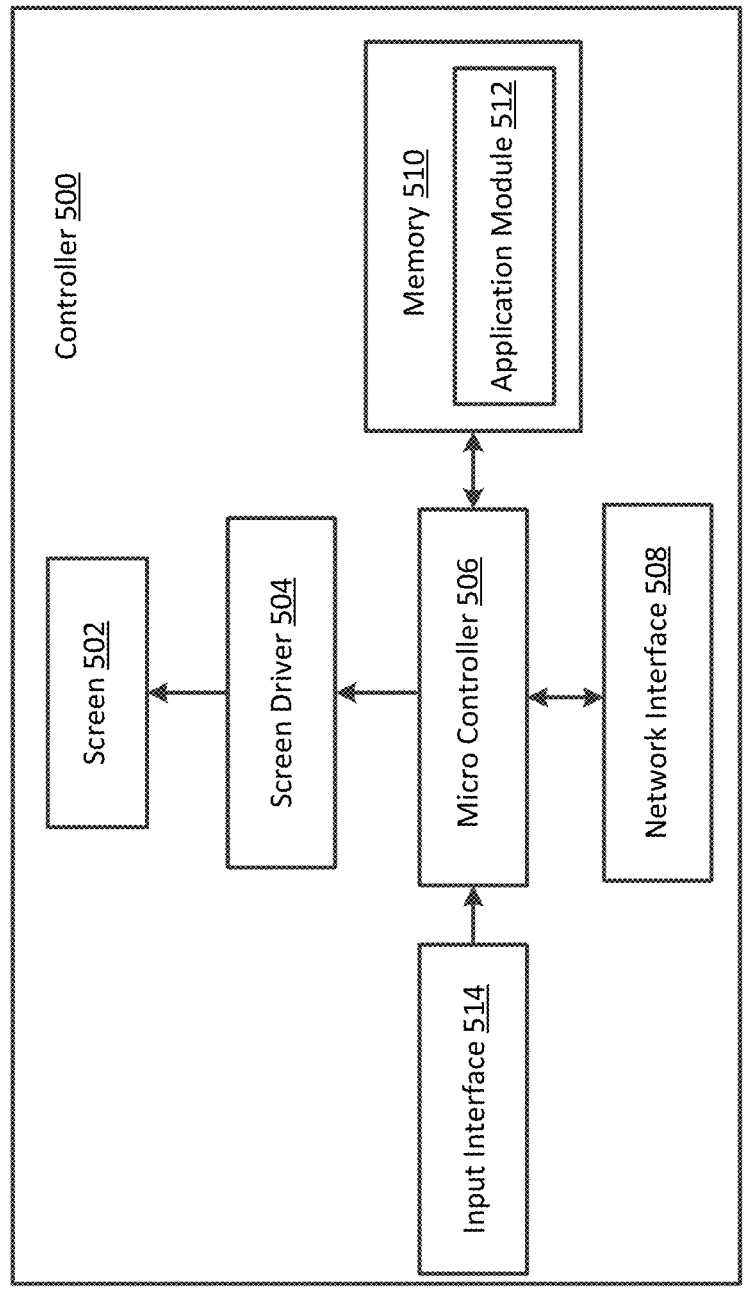
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE®, IPAD® or any other smart phone or network-enabled device (e.g., a networked computer such as a PC or MAC®) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
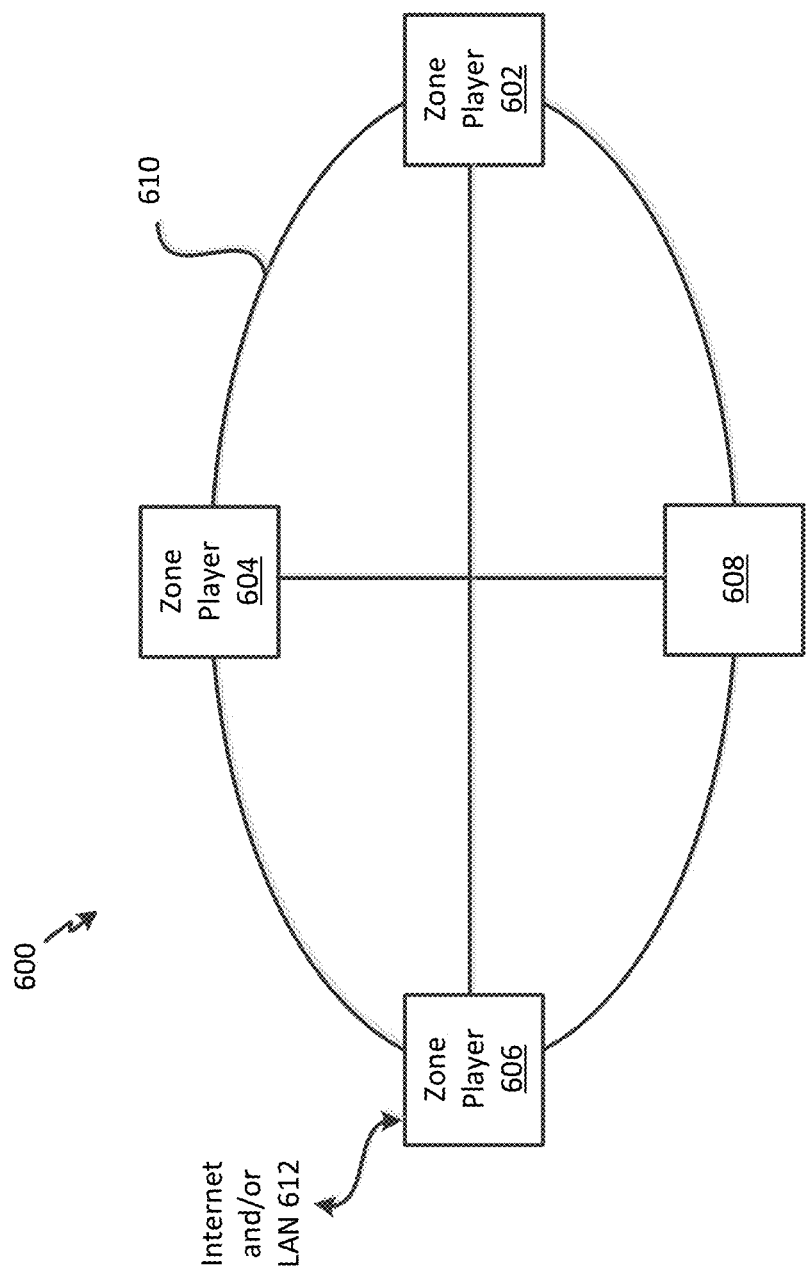
FIG. 6 shows an example ad-hoc playback network.

Certain particular examples are now provided in connection with FIG. 6 to describe, for purposes of illustration, certain systems and methods to provide and facilitate connection to a playback network. FIG. 6 shows that there are three zone players 602, 604 and 606 and a controller 608 that form a network branch that is also referred to as an Ad-Hoc network 610. The network 610 may be wireless, wired, or a combination of wired and wireless. In general, an Ad-Hoc (or "spontaneous") network is a local area network or other small network in which there is generally no one access point for all traffic. With an established Ad-Hoc network 610, the devices 602, 604, 606 and 608 can all communicate with each other in a "peer-to-peer" style of communication, for example. Furthermore, devices may join and/or leave from the network 610, and the network 610 may automatically reconfigure itself without needing the user to reconfigure the network 610. While an Ad-Hoc network is referenced in FIG. 6, it is understood that a playback network may be based on a type of network that is completely or partially different from an Ad-Hoc network.

Using the Ad-Hoc network 610, the devices 602, 604, 606, and 608 can share or exchange one or more audio sources and be dynamically grouped to play the same or different audio sources. For example, the devices 602 and 604 are grouped to playback one piece of music, and at the same time, the device 606 plays back another piece of music. In other words, the devices 602, 604, 606 and 608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 610 (or household identifier), though a HOUSEHOLD may be identified with a different area or place.

In certain embodiments, a household identifier (HHID) is a short string or an identifier that is computer-generated to help ensure that it is unique. Accordingly, the network 610 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy or other security keys). In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., WEP keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 606 in FIG. 6 is shown to be connected to both networks, for example. The connectivity to the network 612 is based on Ethernet and/or Wireless, while the connectivity to other devices 602, 604 and 608 is based on Wireless and Ethernet if so desired.

It is understood, however, that in some embodiments each zone player 606, 604, 602 may access the Internet when retrieving media from the cloud (e.g., the Internet) via the bridging device. For example, zone player 602 may contain a uniform resource locator (URL) that specifies an address to a particular audio track in the cloud. Using the URL, the zone player 602 may retrieve the audio track from the cloud, and ultimately play the audio out of one or more zone players.

VI. Example Home Theater Environment

Figure 7:
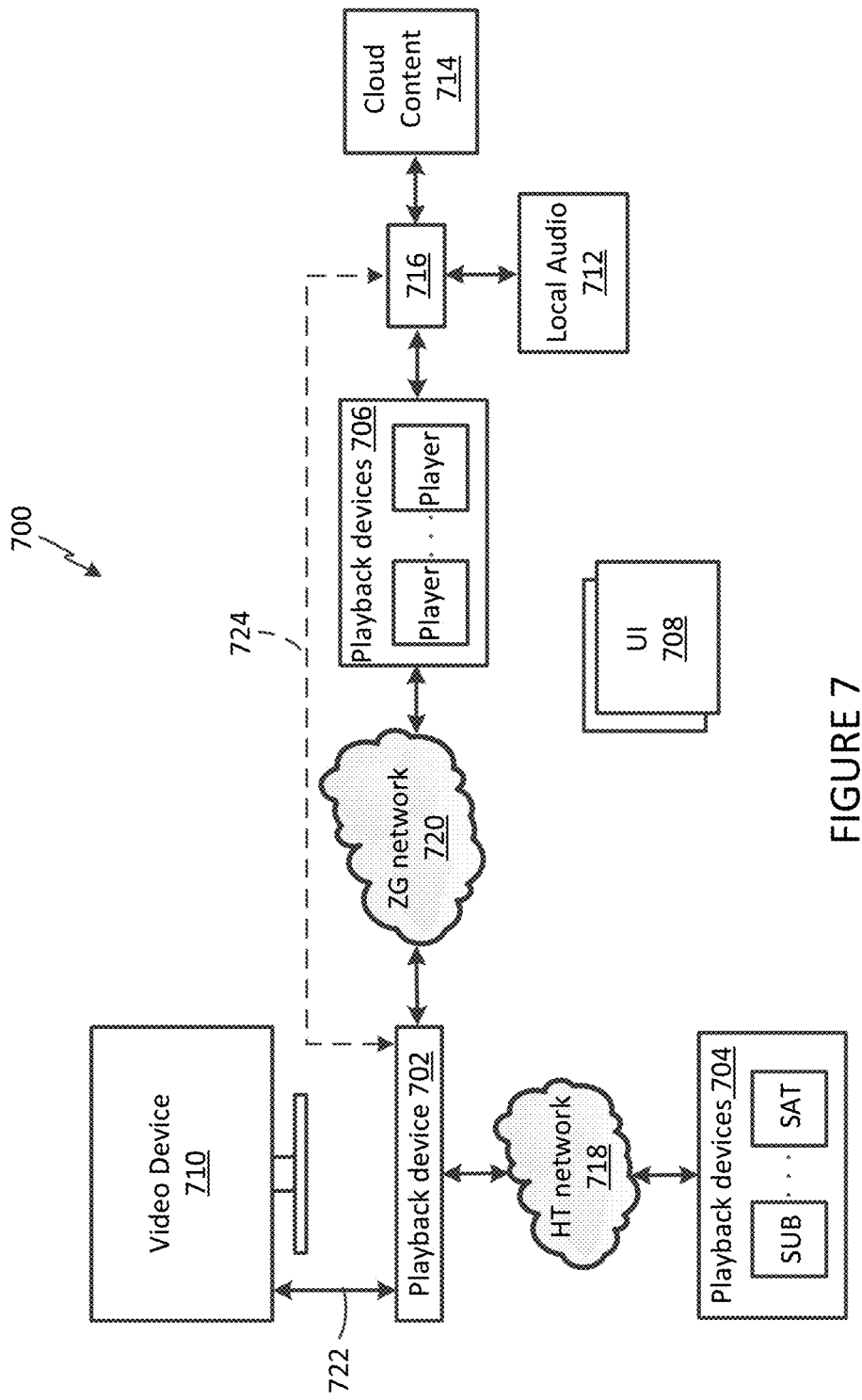
FIG. 7 shows an example network audio system in accordance with an embodiment.

FIG. 7 illustrates an example network audio system 700 constructed in accordance with an embodiment. The network audio system 700 includes a playback device 702, a first group of one or more playback devices generally identified by reference numeral 704, and a second group of one or more playback devices generally identified by reference numeral 706. The playback devices 702, 704, and 706 operate under the control of one or more user interface modules generally identified by reference numeral 708. In an embodiment, the network audio system 700, including the user interface (UI) 708, are shown in FIG. 1 as the system 100 and the controller 130, respectively.

As shown in FIG. 7, the playback device 702 is connected directly or in-directly to a video device 710 that contains, or is connected to, a display for the purpose of viewing video. The video device 710 may include any of a digital video receiver like an Apple TV, cable or satellite box, Blu-ray player, television set, monitor, projector, or any other device or devices that is an audio source to the playback device 702 via a wired or wireless connection 722, more of which is described below.

Similar to the zone players described with respect to the system 100 of FIG. 1, the playback devices 702 and 706 are connected to one or more additional audio sources, examples of which are identified in FIG. 7 generally as local audio 712 and cloud content 714 via a network interface 716. The network interface 716 may include any of a network router, modem, or other network device that allows access to devices on the local area network and/or a wide area network such as the Internet. Local audio 712 may include any of local audio content, such as audio stored and/or accessible from a local device like a personal computer, laptop, mobile device, network accessible storage (NAS) device, an audio reproduction device connected to one of the playback devices 702, 704, and 706, or similar devices capable of storing digital information in volatile or non-volatile form or streaming the digital audio information. Audio source at the cloud content 714 may include Internet audio content or any other source of audio information via a wide area network.

In one embodiment, the playback devices 704 are connected to the local audio 712 and the cloud content 714 via the playback device 702 over the HT network 718. In another embodiment (not shown in FIG. 7), the playback devices 704 are connected to the local audio 712 and the cloud content 714 via the ZG network 720.

With reference to the example illustrated in FIG. 7, the playback device 702 may be connected to the playback devices 704 via a star network, generally referred to in the figure as home theater (HT) network 718, and to the playback devices 706 via a mesh network, generally referred to as zone group (ZG) network 720.

In an embodiment, the ZG network 720 is like the data network 128 of FIG. 1. The ZG network 720 supports the playback of audio in synchrony amongst playback devices 706 and 702 that may be in ear-shot of each other.

In an embodiment, the HT network 718 is a low-latency network to support a higher coordination between audio and the corresponding video than needed by the ZG network 720. That is, the HT network 718 is configured as a low-latency network to prevent or reduce lip synchronization issues between the audio and corresponding video being played via the video device 710.

According to such embodiments, the playback devices 702 and 704 may be configured in a home theater arrangement in a single location, such as the same room (e.g., a home theater room, family room, or some other area where surround sound is desired), and playback devices 706 may be located in the same or different areas from the playback devices 702 and 704. While the present disclosure is not limited to the particular network types described herein, aspects of the HT network 718 and the ZG network 720 are described more below.

In an embodiment, the playback device 702 may be used with the video device 710 to provide the sole reproduction of audio (or substantially the sole reproduction) for the video device 710. In this embodiment, the playback device 702 may be configured, for example, to support the playback of audio either in a single channel or multi-channel mode. By way of illustration, traditional multi-channel modes include, among others, 2.0 (e.g., stereophonic sound), 2.1, 3.1, virtual 5.1, or virtual 7.1 configurations, where the "0.1" typically represents the low-frequency effects channel and virtual 5.1 and 7.1 configurations represent a simulated surround sound effect. The playback device 702 may playback the audio according to a certain configuration based on its particular speaker design, how the incoming audio is encoded, based on a user configuration via the UI 708, or any combination of the three. According to this embodiment, the playback device 702 need not be coupled to the playback devices 704, because the playback device 702, by itself or without the use of another playback device, is used to reproduce the audio for the video device 710.

In another embodiment, the playback device 702 may operate with the playback devices 704 to reproduce a home theater-style listening environment. A home theater-style listening environment may often include a multi-channel surround field, such as 2.1, 3.1, 5.1, or 7.1 channel audio reproductions to recreate the ambiance of a movie theater, but may include other types of multi-channel or single-channel audio playback modes. For instance, the playback devices 704 might include any of a subwoofer or group of subwoofers to reproduce the low-frequency effects channel (SUB), a playback device for each of the right rear and left rear channels (SAT), and other playback devices depending on the setup. As such, the playback devices 704 may only include one or more playback devices depending on the desired setup. In certain embodiments, playback devices may be dynamically added or removed from the playback devices 704 and the system (e.g., the playback devices 702 and 704) reconfigures itself accordingly.

In yet another embodiment, a coupling of the playback device 702 to playback devices 706 via ZG network 720 enables audio from the video device 710 to be played in substantial synchrony by other playback devices 706, and furthermore allows the playback device 702 to be included in an overall audio system (e.g., system 100 shown in FIG. 1), in which additional benefits are provided. If the playback device 702 is not coupled to the playback devices 706 via the ZG network 720, then a connection 724 may be made directly (or indirectly) to network device 716, such that the playback device 702 can be controlled by a wireless enabled controller, has access to local audio content 712, has access to cloud content 714, and so on. In one embodiment, the connection 724 may include wired Ethernet.

In yet another embodiment, a coupling of the playback device 702 to the playback devices 704 via the HT network 718 and the playback devices 706 via the ZG network 720 enables audio from the video device 710 to be played back concurrently by different sets of playback devices 704 and 706, where the playback devices 704 operate using the low-latency HT network 718 and the playback devices 706 operate using the ZG network 720.

Regardless of whether the playback device 702 is connected to playback devices 704 and/or playback devices 706, the playback device 702 can advantageously provide sound reproduction for the video device 710 (e.g., a television set) and wired or wireless access to local audio 712 and/or cloud content 714 for audio playback.

In an embodiment, similar to the controller 130 of FIG. 1, the UI 708 in FIG. 7 can be used to, among other things, configure any of playback devices 702, 704, and 706, such as to modify the audio equalization (EQ) settings, and enable zone group joining and disengaging. For instance, the UI 708 can enable dynamic joining and disengaging of any playback devices of the playback devices 702, 704, and 706 to one or more zone groups (also referred to as synchrony groups). In other words, for instance, if the playback device 702 is currently not a member of a zone group, for example, the playback device 702 may be joined to a zone group via UI 708, after which it will play the audio of that zone group. If the playback device 702 is currently a member of a zone group, the playback device 702 may be disengaged from that zone group via the UI 708. Alternatively, a new zone group may be created with the playback device 702 and another playback device. Additionally, the UI 708 can control other aspects of the network audio system 700, including but not limited to the selection of the audio information source that a particular playback device is to utilize, the volume of the audio playback, to turn audio information source(s) on and off, and so on.

With respect to volume adjustment, in an embodiment, the UI 708 may be used to adjust playback volume by any of the individual playback devices 702, 704, and/or 706 in addition to adjusting a group volume. In operation, the UI 708 can provide information identifying the particular device whose volume is to be adjusted, and the level at which the volume is to be set to a master device or to the playback device, itself.

In an embodiment, the volume for the playback devices 702 and 704 may act in a coordinated fashion such that the UI 708 displays a single volume control. As such, the manipulation of the single volume control may cause the playback devices 702 and 704 to increase or decrease in volume. Each playback device of 702 and 704 may increase or decrease at the same rate or different rates depending on the configuration.

In an embodiment, the playback device 702 determines the type of incoming audio to be played and automatically adjusts the audio playback to enhance the output. For example, stereo (or 2-channel) audio may be processed and played differently than audio consisting of more (or less) than 2 channels. In another example, audio that is associated with video is processed and played differently than audio that is not associated with video. In some embodiments, the adjustments are made based on the source of the audio content (e.g., local audio 712 and/or cloud content 714). In other embodiments, the adjustments are made based on interface over which the audio content arrives to the playback device (e.g., audio that arrives over the network interface 402 or 1202, or audio that arrives over the audio interface 410 or 1210). In yet other embodiments, the adjustments are made based on the application that was used to initiate the audio playback (e.g., audio that is played using a YOUTUBE™ application vs. audio played that is played using a SONOS® application).

In one embodiment, the playback device 702 may be configured to implement a mode of operation referred to herein as "dialog enhancement" that provides an enhancement to audio that is associated with video so that a user can more clearly understand speech. Particularly, in one embodiment, the playback device 702 boosts the center channel, rolls off the bass frequencies, lowers the volume of the satellites, and emphasizes the speech spectrum (e.g., 300 to 3400 Hz). In one embodiment, the playback device 702 is configured via the UI 708 to implement "dialog enhancement" mode of operation. In one embodiment, "dialog enhancement," once configured with the playback device 702, is implemented based on characteristics of the audio content (e.g., is the audio associated with video, what interface does the audio content arrive to the playback device, what application was used to initiate the audio playback, and so on). For example, if "dialog enhancement" is configured on the playback device 702 and the audio content arrives from the video device 710 via connection 722, then the audio is adjusted according to the "dialog enhancement" mode.

In another embodiment, the playback device 702 may be configured to implement a mode of operation referred to herein as "night mode" that applies dynamic range compression in addition to implementing "dialog enhancement." In one embodiment, the playback device 702, is configured via the UI 708 to implement "night mode" mode of operation. In one embodiment, "night mode," once configured with the playback device 702, is implemented based on characteristics of the audio content (e.g., is the audio associated with video, what interface does the audio content arrive to the playback device, what application was used to initiate the audio playback, and so on) as well as a temporal or environmental characteristics (e.g., what time of day is it, is it dark outside, and so on). In one embodiment, the playback device 702 uses a light sensor to determine the relative brightness in the room to determine if the environmental characteristic is met for "night mode." For example, if the light sensor detects, for example, a lux value of less than (<) 1, the environmental characteristic may be met for "night mode" use. In another embodiment, the playback device 702 uses a real-time clock to determine if the temporal characteristic is met for "night mode" use. For example, if the real-time clock indicates the time is between, for example, 8 pm and 6 am, the temporal characteristic may be met for "night mode" use.

In certain embodiments, the playback device 702 obtains audio information from an audio information source, such as the video device 710 (and/or any other audio source such as local audio 712 and/or cloud content 714), adds playback timing information, and transmits the combined audio and playback timing information to the playback devices 704 over the HT network 718 for coordinated playback. The playback device 702 may also transmit the combined audio and playback timing information to playback devices 706 over the ZG network 720 when the playback device 702 is part of a zone group including any of playback devices 706 and the playback device 702 is the master device for the zone group. The playback timing information that is provided with the audio information, together with clock timing information provided by the playback device 702, enables the playback devices 704 and 706, if so grouped, to coordinate playback of the audio information. As will be described more below, the playback timing information is determined for each particular playback device (or a particular group of playback devices) and its role in audio playback.

In certain embodiments, the playback device 702 is part of a zone group including any of playback devices 706, where one of the playback devices 706 is the master device for the zone group. If any of the playback devices 704 are grouped with the playback device 702, then the playback device 702 modifies the playback timing information it receives from the master device to match its local clock, and transmits the combined audio and modified timing information to the playback devices 704 over the HT network 718 for coordinated playback. The playback timing information that is provided with the audio information, together with the clock timing information provided by the playback device 702, enables the playback devices 704 coordinate playback of the audio information with 702 without having to explicitly coordinate with the one of the playback devices 706 which is the master device for the zone group.

In an embodiment, the playback device 702 transmits the audio and playback timing information in messages over the HT network 718, the network connection 724, and/or ZG network 720 using a multi-cast message transmission methodology. In some embodiments, each of the messages includes a multi-cast address (or some other ID or identifying address) that is used to identify the multi-cast group or members of the multi-cast group for which the message is intended. Each playback device monitors the messages on the network, and when a playback device detects a message with its address or a multi-cast group address to which the playback device belongs, they will receive and process the contents of the message. It is understood, however, that the playback device 702 may make use of any convenient multi-cast or uni-cast (or other) message transmission methodology in transmitting the audio and playback timing information to the playback devices 704 and/or 706.

Irrespective of the transmission methodology, in an embodiment, the audio and playback timing information is in the form of a series of frames, with each frame having a timestamp. The timestamp indicates a time, relative to the time indicated by a clock maintained by the playback device 702 or some other designated reference device, at which the frame is to be played. Depending on the size or sizes of the messages used in the selected multi-cast message transmission methodology and the size or sizes of the frames, a message may contain one frame, or multiple frames, or, alternatively, a frame may extend across several messages.

It is understood that the information included in the timestamp(s) may alternatively be provided by the playback device 702 to the playback devices 704 and/or 706 in periodic or non-periodic intervals instead of, or in addition to, in a series of frames.

In an embodiment, the playback device 702 may provide clock time information to the playback devices 704 and/or 706 individually over networks 718 and/or 720 and/or 724, respectively, using a highly accurate clock time information transmission methodology. In one embodiment, the system 700 utilizes an out-of-band protocol, such as the SNTP (Simple Network Time Protocol), to obtain current clock time information from the playback device 702. The SNTP makes use of a unicast message transfer methodology, in which one device, such as the playback device 702, provides clock time information to a specific other device, such as any of the playback devices 704 and 706. According to this embodiment, each of the playback devices 704 and/or 706 will periodically initiate SNTP transactions to obtain the clock time information from the playback device 702.

The playback devices 704 and/or 706 can make use of the clock time information to determine the time differential between the time indicated by the playback device's (702) clock and the time indicated by its respective clock, and use that time differential value, along with the playback time information associated with the audio information and the respective device's local time as indicated by its clock to determine when the various frames are to be played. This enables the playback devices 702, 704 and/or 706 to coordinate playback. Coordinated playback may not always result in perfect, or substantially perfect, synchrony as a result of using a wireless technology between playback devices 702, 704, and/or 706. In some instances, coordinated playback includes a user imposed delay, such that the audio is intentionally not played in synchrony, but rather exhibits a more theater-like listening experience.

Additionally, it is understood that the playback device 702 may not transmit audio and playback timing information over the networks if playback devices 704 and 706 are not used. The playback device 702 can maintain a count of the number of playback devices as they join and disengage, and, if the number drops to zero, it can stop transmitting the audio and playback timing information over any of the networks 718 and/or 720. Furthermore, it is understood that there may be multiple synchrony groups in the network audio system 700, and further that, for example, playback device 702 may operate both as a master or primary device (e.g., a device that may be configured to provide audio and timing information) and a slave device (e.g., a device that may be configured to receive the audio and timing information).

In an embodiment, when the playback device 702 provides the audio information to the playback devices 704 and/or 706, the playback device 702 may divide the audio stream or file into a series of frames, with each frame containing digital audio information for a predetermined period of time. A particular frame in a digital audio stream may contain a series of audio samples. Associated with each frame is a header that includes a number of fields for storing other information that is useful in controlling playback of the audio samples in the respective frame. For instance, the header associated with a frame may include a frame sequence number field, an encoding type field, a sampling rate information field, a timestamp field, an end of track flag, and a length flag field. The header may also include fields for storing other information that is useful in controlling playback. Generally, the frame sequence number field receives a sequence number that identifies the relative position of the frame in the sequence of frames containing the digital audio stream. The encoding type field receives a value that identifies the type of encoding and/or compression that has been used in generating the digital audio stream. Depending on the audio source, conventional encoding and/or compression schemes include, for example, MP3, WMA, AAC, and WAV encoding and/or compression schemes, although it will be appreciated that other schemes may be provided for as well. The sampling rate information field receives sampling rate information that indicates the sampling rate for the audio samples. The condition of the end of work flag indicates whether the frame contains the last digital audio samples for the audio track associated with the framed digital audio work. If the frame does not contain the audio samples that are associated with the end of the digital audio stream for a respective audio work, the end of work flag will be clear. On the other hand, if the frame does contain the audio samples that are associated with the end of the digital audio stream for a respective audio work, the end of work flag will be set. In addition, since the number of valid audio samples in the frame, that is, the samples that are not padding, may be less than "S," the default number of audio samples in a frame, the length flag field will contain a value that identifies the number of audio samples in the last frame of the audio work.

According to an embodiment, the timestamp field stores a timestamp that identifies the time at which a particular playback device is to play the respective frame. More specifically, for each frame of a framed digital audio stream that is buffered in the audio information buffer, the playback device 702, using timing information from its digital to analog converter clock, can determine a time at which a particular playback device is to play the respective frame, and stores a timestamp identifying the playback time in the timestamp field. The timestamp associated with each frame can be used by a playback scheduler (e.g., contained within each of the playback devices 702, 704, and 706) to determine when the portion of the digital audio stream stored in the frame is to be coupled to the digital to analog converter to initiate playback. It will be appreciated that the timestamps that are associated with frames in sequential frames may be such that they can be played back in order, and without an interruption between the sequential frames comprising the digital audio stream. The timestamps may also be such that frames will be played back after some slight time delay after they have been buffered in the audio information buffer.

Figure 8:
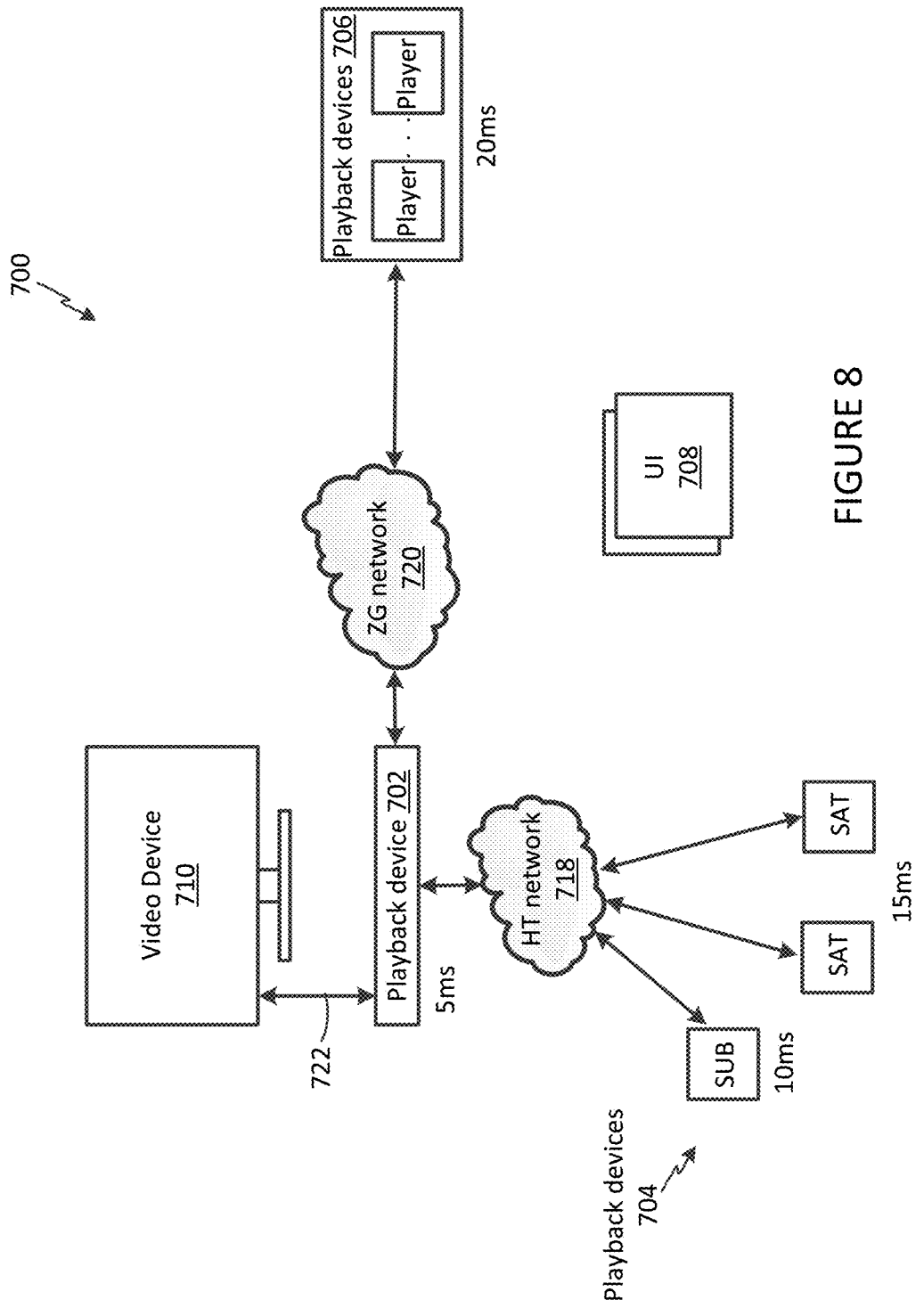
FIG. 8 shows the network audio system of FIG. 7 in operation.

FIG. 8 illustrates the example network audio system 700 of FIG. 7, where the playback device 702 is coupled to three different playback devices at 704, via the HT network 718, and is grouped in a zone with at least one other playback device 706, via the ZG network 720. Particularly, the three playback devices 704 include a subwoofer (SUB) and two satellite speakers (SAT). In the illustrative embodiment of FIG. 8, it is assumed that the HT network 718 and the ZG network 720 are using wireless networks, such as described above, in which audio information is being sent wirelessly from the playback device 702 to the playback devices 704 and 706. As such, certain timing delays are introduced by the playback device 702 to enable the receiving devices to receive and process the audio information. In other embodiments, the HT network 718 and/or the ZG network 720 are using wired networks (e.g., 100 Mb or 1 Gb Ethernet networks). As such, certain timing delays may be different than the delays introduced for wireless networks. In yet other embodiments, the timing delays may be different depending on the number of zone players that are grouped together and/or the total number of zone players in the system. In addition, certain timing delays may be introduced to provide a home-theater listening environment. In an embodiment, these timing delays are reflected in the timestamps assigned to various audio channels, groups of audio channels, or audio to be sent to a zone group by the playback device 702.

In an embodiment, the playback device 702 determines that the playback devices 704, and in this example a SUB and two SATs, are part of its configuration. To do so, for example, the playback device 702 can look to a locally stored state variable that lists members of a group, if any. Furthermore, the playback device 702 determines that it is a part of a zone group with one or more playback devices 706. Again, according to an example, the playback device 702 can look to the locally stored state variable to make this determination. Upon receiving audio information from the video device 710 via connection 722, the playback device 702 identifies the audio that is to be transmitted to the playback devices 704 and the audio that is to be transmitted to the playback devices 706. In some instances, the audio sent to various playback devices or groups of playback devices may be different. In other words, the audio sent to the playback devices 706 might include all of the available frequencies and/or channels, for example, whereas the audio sent to the playback devices 704 might include different sets of frequencies and/or channels depending on the playback device and its purpose.

For audio to be played by the playback device 702 and playback devices 704, the playback device 702 may separate the audio into different channels, such as front-right, front-left, center, left-rear, right-rear, surround-right, surround-left, and subwoofer. If two or more channels are to be played by the same device, then the playback device 702 may group them together. For instance, the playback device 702 may be configured to play the front-right, center, and front-left channels. Then, for each audio channel or group of channels, the playback device 702 assigns a timestamp to the audio frame specifying the time at which the audio should be played by its respective device.

With reference to FIG. 8, a timestamp may be provided that indicates a time to play the three-channel audio (e.g., front-right, center, and front-left channels) from the playback device 702, such that the time is delayed by, for example, 5 milliseconds (ms) from when the corresponding video is to be displayed at time (t)=0.0 via the video device 710. With respect to the SUB channel, the playback device 702 may assign a timestamp of 10 ms past t=0.0. With respect to the SAT channels, the playback device may assign each a timestamp of 15 ms past t=0.0. Note that the SAT channels (and SUB channels, if multiple SUBs are grouped together) do not need to be assigned the same timestamp as each other, and can be assigned different timestamps. For instance, if a user is sitting closer to the rear-left SAT, then its timing value may be different from the rear-right SAT. The timing value may be adjusted via the UI 708. The playback device 702 may then send the audio and timing information (audio and timing information may also be collectively referred to as "audio information") to the respective playback devices 704 and assign them to a high priority queue, so as to be processed more quickly than traditional audio (e.g., audio from over the ZG network 720) where video synchronization isn't available and/or necessary.

In another embodiment, a designated device other than the playback device 702 assigns the timestamp.

In yet another embodiment, the playback devices 704 and/or 706 themselves apply the delay at their respective devices to the received audio information. In such an embodiment, the delay value(s) may be assigned to the playback devices 704 and/or 706 via the playback device 702 or some other designated device.

For the playback devices 706, the playback device 702 may assign a timestamp that indicates a time to play the zone group audio information at 20 ms past when the corresponding video is displayed at t=0 via the video device 710. A copy of the audio frames may be sent to each playback device within the playback devices 706, as each will most likely receive and play the same audio information. In an embodiment, the priority to send these audio frames to the playback devices 706 via the ZG network may be lower than frames sent to the playback devices 704 via the HT network 718.

It is understood that in one embodiment, the lower priority given to the playback devices 706 is due to the desire to use the processing capabilities at the playback device 702 to maintain a high coordination between the video being displayed via the video device 710 and the audio being played via the playback device 702 and/or the playback devices 704. If, however, the processing capabilities are not limited or are fast enough to process the audio information without human detection, then the use of priority becomes less relevant or unnecessary.

In an embodiment, the timestamp indicates a time to play the audio by a particular player. As such, the timestamp includes a delay, if any, for a particular player or group of players. For instance, a delay of 5 ms may be applied to all playback devices 702 and 704 as a base-line delay. The base-line delay may be for time called for to process and/or distribute the audio information to one or more players. Additional delays that are specific to the players may also be applied. Accordingly, the playback device 702 might be configured to play at t+5 ms, the SUB might be configured to play at t+5 ms+5 ms, and the SATs might each be configured to play at t+5 ms+10 ms, for example.

Figure 9:
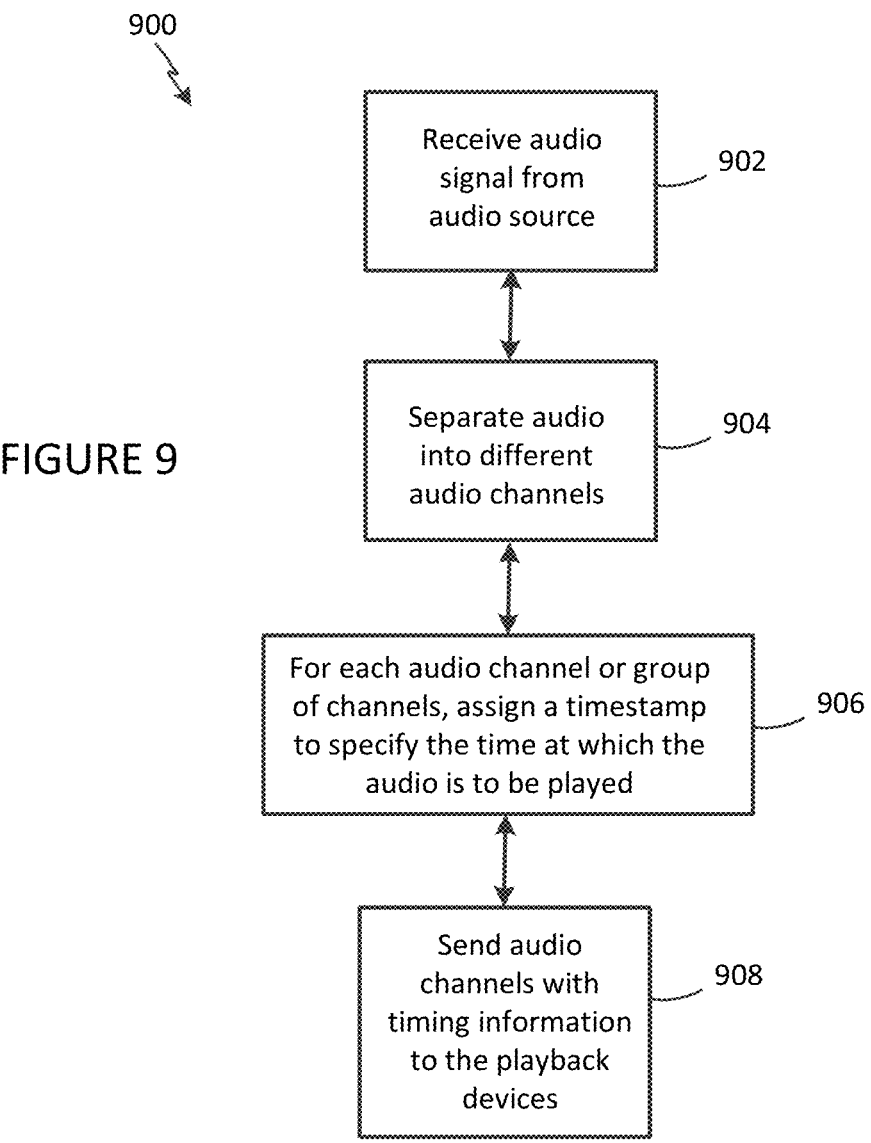
FIG. 9 shows a flowchart representative of an example method to assign timing information in a home theater like environment.

FIG. 9 shows a flowchart 900 representative of an example method to provide audio with timestamps to the playback devices 704 via HT network 718. In one embodiment, the method 900 is implemented in software and/or hardware of the playback device 702. Alternatively, the method 900 may be implemented by a designated device that is different from the playback device 702.

At block 902, the playback device 702 may receive an audio signal from an audio source such as the video device 710 via the connection 722. The connection 722 may utilize any of the Ethernet standards, an optical fiber connection system like TOSLINK, an HDMI connection, an IEEE 802.11 compliant wireless connection, or some other connection that allows transmission of the audio signal to the playback device 702.

At block 904, the playback device 702 may process the incoming audio signal by separating audio information contained in the audio signal into different audio channels. The audio channels may include, for example, any of a front-left, front-right, center, low-frequency, surround-left, surround-right, surround-back-left, and surround-back-right. The playback device 702 may likewise group certain channels together to be played by a single playback device, for example. An example of channel grouping includes grouping the front right, center and front left channels together to be played by the playback device 702.

At block 906, the playback device 702 assigns a timestamp to the audio information based on the channel, where the timestamp indicates a time at which the audio is to be played by a particular playback device. In one example, the front-left, front-right, and center are assigned a timestamp at or below 5 ms for playback device 702; the surround-left and surround-right are assigned a timestamp at or below 15 ms for SAT playback devices 704; the subwoofer is assigned a timestamp at or below 10 ms for the SUB playback device 704. The timestamp for the rear surrounds may be based on adding an intentional delay to provide a surround effect. The timestamp for the subwoofer may be based on providing enough time to receive audio packets wirelessly via the HT network and based on the assumption that bass frequencies do not require the level of synchronization as higher frequencies. Additionally, the time delays may also be based on content, or the source of content. For example, stereo audio may be played at different delays.

At block 908, the playback device 702 may send the different channels of audio information with their respective timestamps to the playback devices 704.

Figure 10:
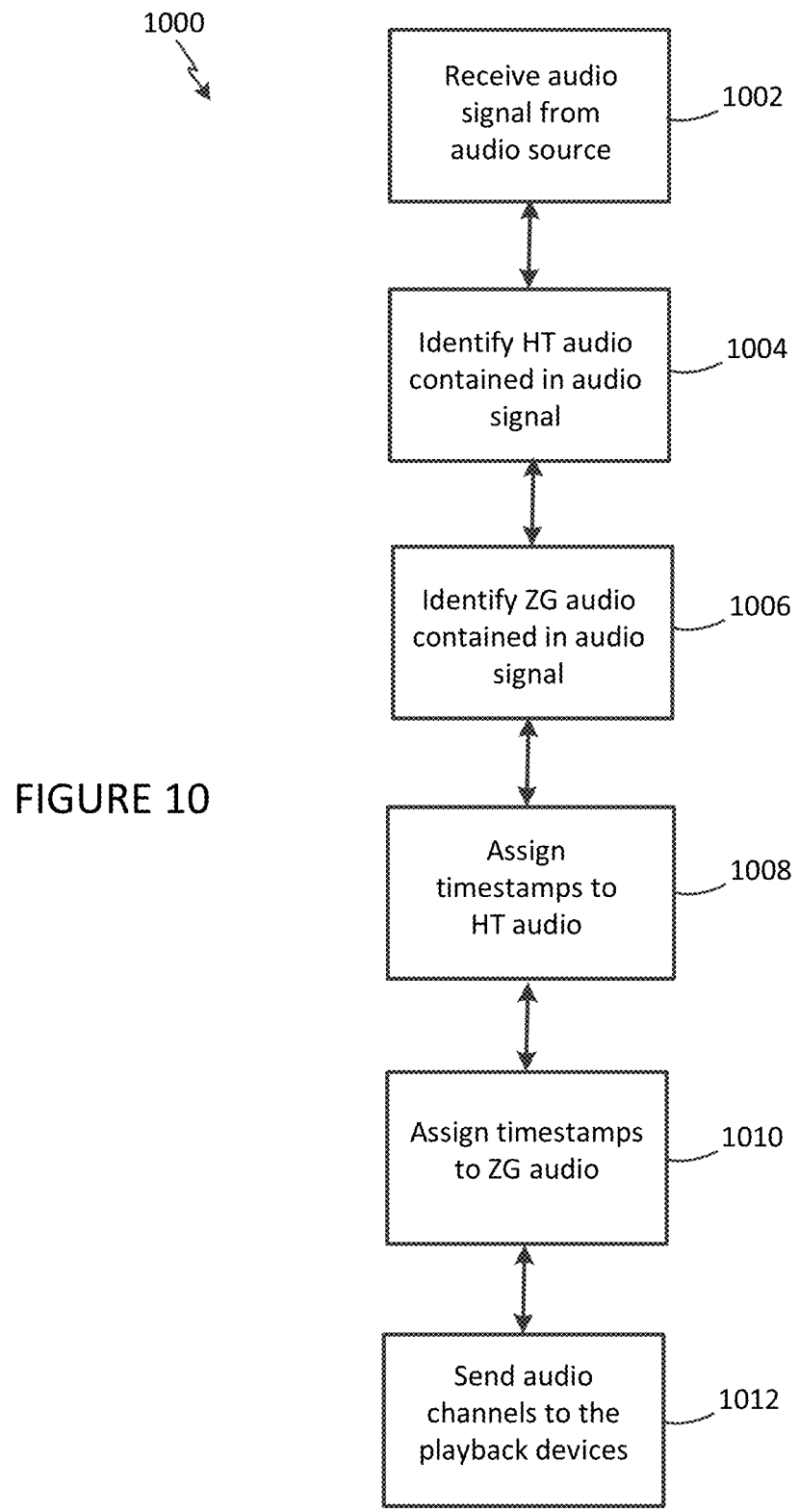
FIG. 10 shows a flowchart representative of an example method to assign timing information in a home theater like environment and a zone group.

Alternatively, it is understood that the playback device 702 may forward the audio signal from the audio source onto the playback devices 704 via the HT network 718 without separating the audio into separate channels or groups of channels. As such, the respective, receiving playback device can parse the data to find its channel information to playback. Additionally, the respective, receiving playback devices may store the delay information and use that information to determine a playback time instead of the playback device 702 propagating the timestamp information with the audio information, as described above in block 906. FIG. 10 shows a flowchart 1000 representative of an example method to provide audio with timestamps to the playback devices 704 and playback devices 706. In one embodiment, the method 1000 is implemented in software and/or hardware of the playback device 702. Alternatively, the method 1000 may be implemented by a designated device that is different from the playback device 702.

At block 1002, the playback device 702 may receive an audio signal from an audio source, such as the video device 710 via the connection 722.

At block 1004, the playback device 702 may identify home theater audio information contained in the audio signal for playback by the playback devices 704 (e.g., home theater "HT" players).

At block 1006, the playback device 702 may identify zone group audio information contained in the audio signal for playback by the playback devices 706 (e.g., zone group "ZG" players). It is understood that zone group audio information is likely to overlap with home theater audio information. That is, the zone group audio information may contain all, or substantially all, of the frequencies found in the home theater audio information.

At block 1008, the playback device 702 may assign one or more timestamps to home theater audio information that indicates a time at which audio is to be played by the plurality of home theater players.

At block 1010, the playback device 702 may assign a zone group timestamp to the zone group audio information that indicates a time at which audio is to be played by the one or more players in the zone group.

At block 1012, the playback device 702 may send the home theater audio information with the one or more timestamps to the plurality of home theater players and send the zone group audio information with the zone group timestamp to the one or more players in the zone group.

Figure 11:
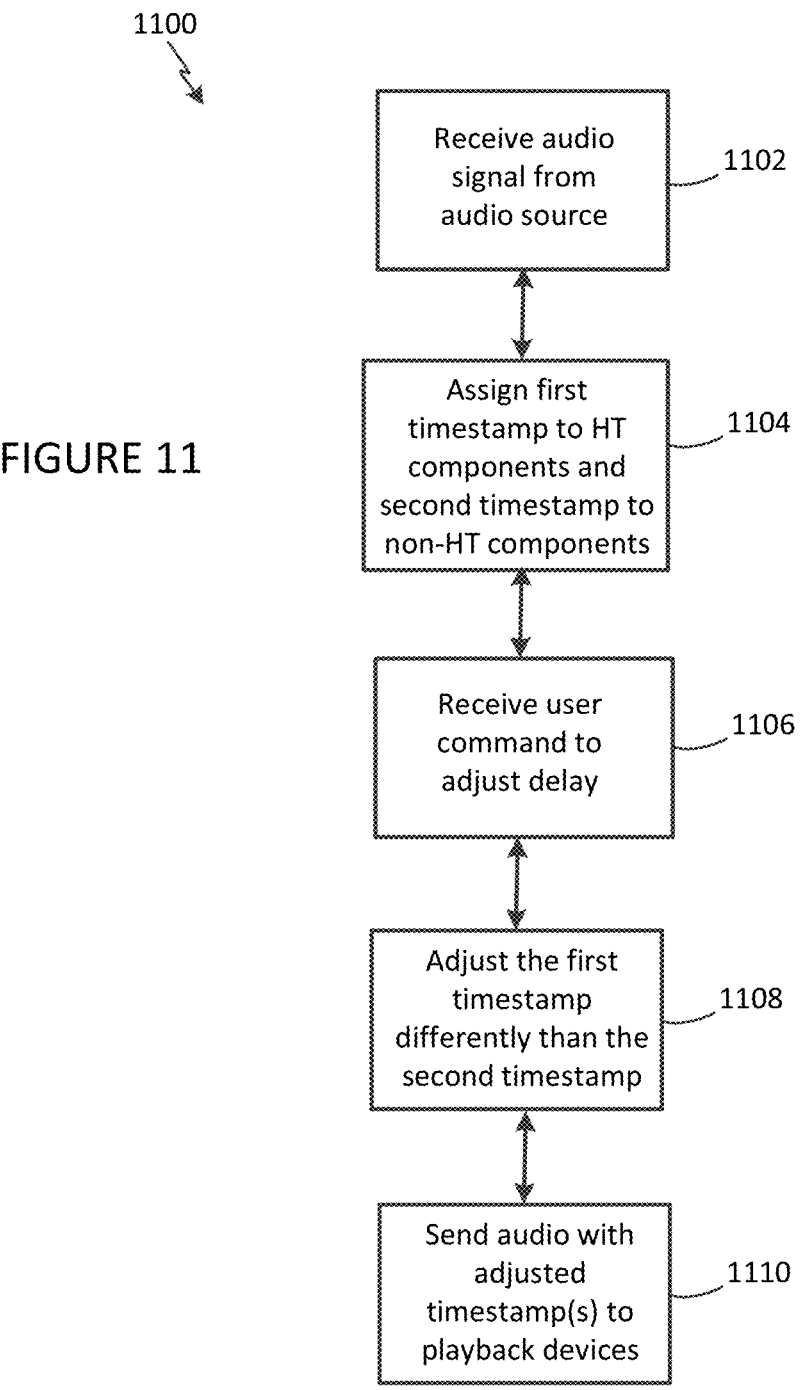
FIG. 11 shows a flowchart representative of an example method to adjust timestamps.

FIG. 11 shows a flowchart 1100 representative of an example method to adjust time delay for the playback devices 704 and/or 706. According to the figure, the system is intelligently adjusting time delays for home theater and non-home theater groups of players based on the user adjustment. In one embodiment, the method 1100 is implemented in software and/or hardware of the playback device 702. Alternatively, the method 1100 may be implemented by a designated device that is different from the playback device 702.

At block 1102, the playback device 702 receives an audio signal from an audio source, such as the video device 710 via the connection 722. The audio signal comprises digital audio information, although it is understood that the audio information may be analog and then converted to a digital format. An example connection 722 is a TOSLINK, which is a standardized optical fiber connection. The playback device 702 receives and decodes the audio stream.

At block 1104, the playback device 702 assigns a first timestamp to home theater audio information contained in the audio signal, wherein the first timestamp indicates a first time at which audio is to be played by a first player of a plurality of home theater (HT) components or players. According to FIG. 7, HT components are represented by any of playback devices 702 and 706. The first timestamp includes a particular delay component. For example, a first timestamp might be to play at 10 ms, where 10 ms=t+5 ms+5 ms, where "t" represents an approximate time that the video is displayed, 5 ms represents a time value that all home theater players are delayed (e.g., a base delay), and 5 ms represents a specific time delay tailored for an individual player or groups of players.

At block 1106, the playback device 702 assigns a second timestamp to the zone group audio information contained in the audio signal, wherein the second timestamp indicates a second time at which audio is to be played by a second player of a plurality of non-HT components or players, wherein the first and second players are different and the first and second times are different. According to FIG. 7, non-HT components are represented by any of the playback devices 706. The second timestamp includes a second delay component. For example, a second timestamp might be to play at 20 ms, where 20 ms=t+20 ms.

At block 1104, the playback device 702 receives a user command to adjust a delay that is to be played by the plurality of players. For example, the user may adjust the delay between the video and the audio to improve synchronization between the video and audio. In another example, the user may adjust the delay to improve the multichannel audio affects depending on, for example, the location of the user within the room. In one example, different delays are used for speakers depending on, for example, if the speaker is less than two feet from the user, the speaker is between two feet and ten feet from the user, and the speaker is more than ten feet from the user.

At block 1108, the playback device 702 adjusts the first time differently than the second time responsive to the user command. For example, the first time corresponding to the HT components is adjusted, whereas the second time corresponding to the non-HT components are not adjusted. An example includes a first time to be played at t+5 ms+5 ms and a second time to be played at t+20 ms, where again "t" represents an approximate time that the video is displayed. When an adjustment is made, such as +5 ms, then the first time might look like play at t+5 ms+10 ms and the second time might stay the same. In other words, the system is trying to achieve a balance between a delay for HT components and a delay for non-HT components.

At block 1110, the playback device 702 sends the audio to the plurality of players with the at least adjusted first time. In some instances, the first time is the only time adjusted. In some instances, the first time and the second time are both adjusted, and in some instances, only the second time is adjusted. The first time and/or second time is adjusted via the timestamps.

VII. Low-Latency Network

According to FIG. 7 described above, the HT network 718 is used by the playback devices 702 and 704 to exchange (e.g., transmit and receive) information. In an embodiment, the HT network 718 represents a low-latency network to enable multi-channel audio, and in particular, to enable multi-channel audio in a home-theater like environment. The following definitions may be used throughout this disclosure, and in particular, used to describe an example operation of a low-latency network like HT network 718.

The terms "spectrum" or "wireless spectrum" refer to a range of wireless communications frequencies, where different "spectra" (multiple spectrum) refer to different ranges of wireless frequencies. Different spectra may or may not overlap. Different spectra may or may not be contiguous (i.e., may or may not have spectra between them). In some examples disclosed herein, the term spectrum refers to a regulatory spectrum as defined by a regulatory agency such as the Federal Communications Commission (FCC) in the United States. For example, the FCC has allocated the "2.4 GHz spectrum" (or spectral band) to include the frequency range of 2400 MHz to 2500 MHz for Industrial, Scientific, and Medical applications. Additionally, the FCC has allocated the "5 GHz spectrum" (or spectral band) to include the frequency range of about 5.17 GHz to about 5.835 GHz, with some excepted bands within that range.

The terms "channel," "audio channel," "control channel," and/or, more generally, "wireless channel," all refer to a distinct frequency or distinct sub-range(s) of frequencies within one or more spectra that may be used to transmit particular information. A channel may be a band of frequencies, a non-contiguous set of frequencies and bands, a frequency hopping configuration, time division multiplexing, code division multiplexing, and/or any other type of communication frequency arrangement.

The terms "primary" or "primary zone player" refer to a zone player configured to control a low-latency audio network having zero or more "satellite" zone players. A "satellite" or "satellite zone player" refers to a zone player configured to provide low-latency audio in combination with a primary zone player. Both primary zone players and satellite zone players may be configurable to operate in other audio playback arrangements, such as in a zone group.

Referring back to FIG. 7, the playback device 702 may be considered a primary zone player and the playback devices 704 may be considered the satellite zone players. It is understood, however, that a standalone device may perform all, or most of, the functions associated with a primary zone player, and as such, the disclosure is not limited to a zone player operating as the primary device.

The term "low-latency audio" generally refers to audio played within a threshold time of another event (e.g., video played on a monitor substantially synchronized with audio played via a zone player). For instance, in some embodiments audio is considered low-latency when the audio is played within a threshold time (e.g., at or around 30 milliseconds) of the corresponding video being shown. In some embodiments, audio is considered low-latency when the audio is played (e.g., from a speaker) within a threshold time (e.g., at or around 30 milliseconds) of being provided from a source of the audio (e.g., from a media source such as a television, a cable set top box, a digital media player, a DVD player, a Blu-ray disc player, etc.). Other measures of latency and low-latency may be used in different embodiments and even have different meanings depending on the application.

Figure 12:
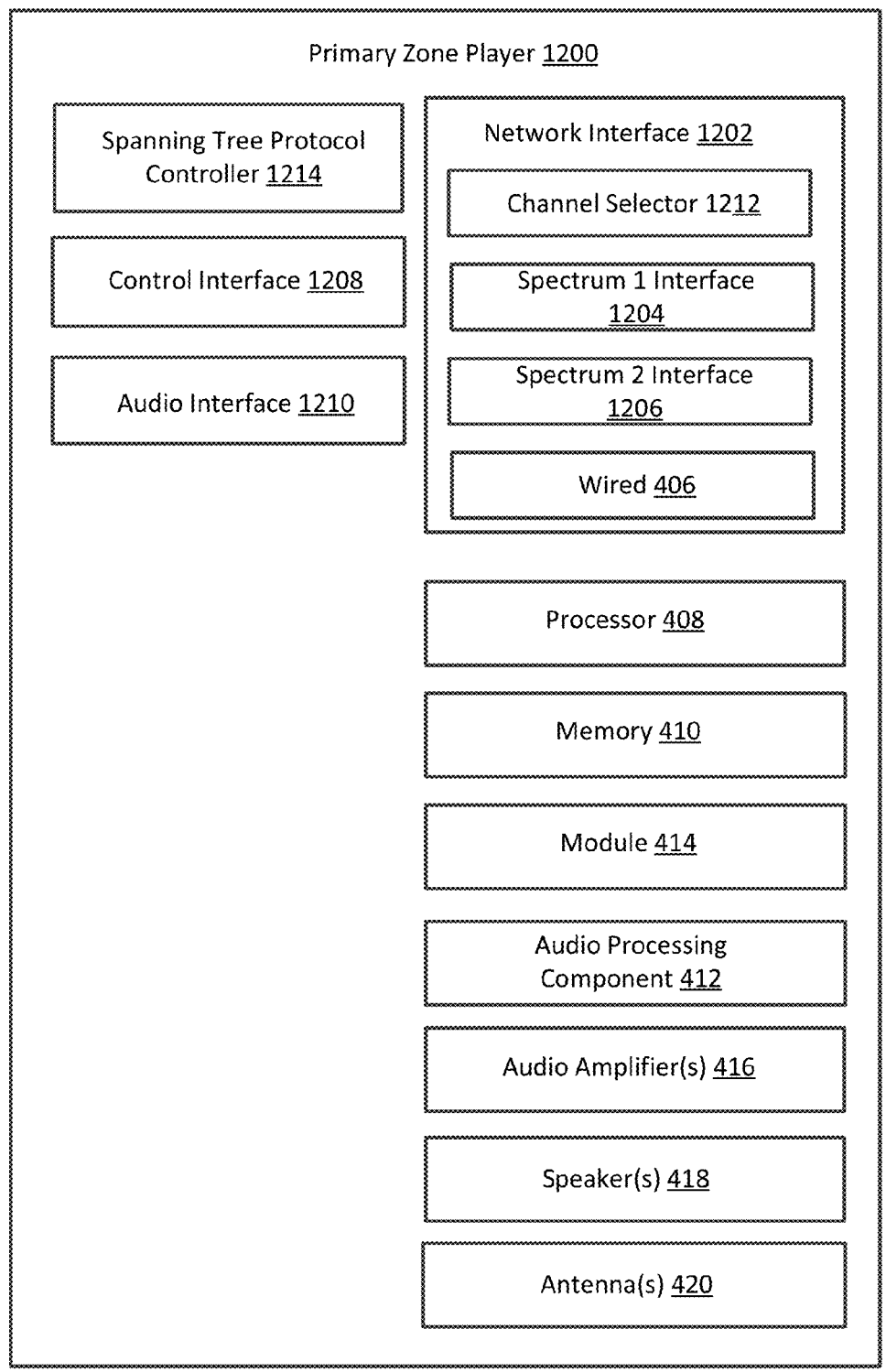
FIG. 12 shows an internal functional block diagram of a primary zone player to provide low-latency audio.

FIG. 12 shows an internal functional block diagram of an example primary zone player to provide low-latency audio. The example primary zone player 1200 of FIG. 12 may be used to implement any of the example zone players 102-124 of FIG. 1. In some embodiments, the example primary zone player 1200 may be used to implement one of the home theater zone players 116, 118, 120. In some embodiments, the primary zone player 1200 may be used to implement the playback device 702 in FIG. 7. In some embodiments, the primary zone player 1200 is a sound bar. As used herein, a "sound bar" refers to a single playback device including an array of speakers configured to replicate audio for video and to replicate audio in general. In some instances, a sound bar may play three channels of audio including a front right, center, and front left. In some instances, a sound bar may simulate or partially simulate a surround sound experience.

Like the example zone player 400 of FIG. 4, the example primary zone player 1200 of FIG. 12 includes a processor 408, memory 410, an audio processing component 412, a module 414, an audio amplifier 416, speakers 418, and one or more antenna(s) 420. These components are discussed in more detail above. More or less components may be included depending on the desired configuration. The example primary zone player 1200 of FIG. 12 includes a network interface 1202 having a first interface 1204 (Spectrum 1 interface) to communicate via a first wireless spectrum (e.g., the 2.4 GHz spectrum), a second interface 1206 (Spectrum 2 interface) to communicate via a second wireless spectrum different from the first wireless spectrum (e.g., the 5 GHz spectrum), and a wired interface 406. The wired interface 406 is discussed above. The example primary zone player 1200 may simultaneously or substantially simultaneously communicate via any or all of the interfaces 406, 1204, and 1206.

Each of the example interfaces 406, 1204, 1206 of FIG. 12 may have a unique identifier such as a unique Media Access Control (MAC) address. Thus, each of the example interfaces 406, 1204, 1206 may be addressed separately, and the example primary zone player 1200 may communicate using any or all of the interfaces 406, 1204, 1206 simultaneously if so desired.

The example primary zone player 1200 of FIG. 12 further includes a control interface 1208 and an audio interface 1210. The control interface 1208 transmits and/or receives control information (e.g., configuration information) wirelessly, for example, via the first and second spectrum interfaces 1204, 1206. For example, the control interface 1208 may communicate configuration information to one or more satellite zone players and/or communicate configuration information to one or more other zone players via the first spectrum interface 1204. In some examples, the control interface 1208 receives configuration information via the first spectrum interface 1204 from other zone players. The example control interface 1208 additionally or alternatively communicates control information (e.g., channel probes, keep-alive probes, etc.) to satellite zone players via the second spectrum interface 1206. It is also understood that the wired interface 406 could instead (or in addition to the wireless interfaces 1204 and/or 1206) to transmit and receive control information.

The example audio interface 1210 of FIG. 12 transmits audio information and/or receives audio information via the interfaces 406, 412, 1204, 1206. For example, the audio interface 1210 may receive digital audio information from an Internet source, from a local networked source (e.g., a computer via a LAN), and/or from another home theater component such as a video device (e.g., a television set, a cable box, an optical media player (DVD, Blu-ray disc, etc.), a digital media player, a video game console) and/or any other type of audio source. The example audio interface 1210 further transmits received audio information to one or more zone players, including standard zone players (e.g., via line-out connection such as RCA or optical output, or via a mesh network via the first spectrum interface 1204, such as a 2.4 GHz interface) and/or satellite zone players (e.g., via a star network via the first spectrum interface 1204 and/or the second spectrum interface 1206). In some examples, the audio interface 1210 transmits the audio information based on control information provided by the control interface 1208.

To control which channels are used in the first and second spectra, the example network interface 1202 further includes a channel selector 1212. The example channel selector 1212 selects channels in the first spectrum. The example first spectrum interface 1204 transmits and/or receives information via the selected channel. In some examples, the channel is selected by a different device (e.g., an external device such as another zone player), and the channel selector 1212 is provided with the channel information via the first spectrum interface 1204. The example channel selector 1212 also selects channels for use in the second spectrum. The second spectrum interface 1206 transmits and receives data via the selected channel(s) in the second spectrum.

In some examples, the currently selected channel may become unsuitable for low latency audio, and another, more suitable channel is available. The example channel selector 1212 may select a new channel within the same spectrum (e.g., the 5 GHz spectrum) and provide the channel information to the control interface 1208. The example control interface 1208 generates and sends a probe or other configuration information, including a command to switch channels and the new channel information, to any connected satellite zone players. The example channel selector 1212 then causes the second spectrum interface 1206 to change to the new selected channel. The audio interface 1210 may then continue to transmit audio information on the new selected channel.

In some examples, the currently selected channel may become unsuitable for low latency audio, and no other suitable channels are available within the same spectrum. The example channel selector 1212 may select a channel within a different spectrum (e.g., the 2.4 GHz spectrum) and provide the channel information to the control interface 1208. The example control interface 1208 generates and sends a probe or other configuration information, including a command to switch channels and the new channel and spectrum information, to any connected satellite zone players. The audio interface 1210 may then continue to transmit audio information on the new channel of the different spectrum The example primary zone player 1200 of FIG. 12 further includes a spanning tree protocol controller 1214 to control a spanning tree protocol configuration. Spanning tree protocol refers to a network protocol that structures a network to avoid bridge loops by, in general, 1) designating a root node, 2) calculating the least cost path from other nodes to the root node, and 3) disabling other paths. The example primary zone player 1200 of FIG. 12 advantageously uses spanning tree protocol to communicate with satellite zone players and/or other zone players in a mesh network. The use of spanning tree protocol enables the delivery of low-latency audio by determining shortest paths between points and by reducing (e.g., avoiding) unnecessary hops of the low-latency audio data between zone players. An example spanning tree protocol configuration may be a spanning tree protocol table (e.g., stored in the memory 410) that includes the ports and/or devices to which the example primary zone player 1200 is connected. The example spanning tree protocol controller 1214 reconfigures the spanning tree protocol table when additional zone players are added and/or when configurations of zone players change. For example, the spanning tree protocol controller 1214 changes the spanning tree protocol table when the primary zone player 1200 disconnects from a satellite zone player (e.g., connected via a mesh networking mode) and reconnects to the same satellite zone player in a different networking mode (e.g., a star networking mode).

In an example mode of operation, the control interface 1208 initially (e.g., on startup, on adding a satellite zone player to a zone player network) communicates with one or more satellite zone players via the first spectrum interface 1204. The control interface 1208 transmits control information to the satellite zone player(s) via a selected channel in the first spectrum. The example control information includes at least a selected channel in the second spectrum and an identifier of the primary zone player 1200 (e.g., to differentiate the primary zone player 1200 from any other primary zone players that may be on the same network). After transmitting the control information (and, in some embodiments, receiving acknowledgement from the satellite zone player(s)), the example audio interface 1210 may begin transmitting audio information to the satellite zone player(s). In some embodiments, the audio interface 1210 transmits zone player specific audio information to each of multiple zone players (e.g., left surround channel audio to a zone player configured as a left surround speaker, right surround channel audio to a zone player configured as a right surround speaker).

Continuing with the example, if the selected channel in the second spectrum is inadequate (e.g., too much interference, too much latency, etc.), the example control interface 1208 of FIG. 12 transmits control information to the satellite zone players to cause the satellite zone players to revert to communicating with the primary zone player 1200 via a channel in the first spectrum and the first spectrum interface 1204. The example channel selector 1212 selects a different channel in the second spectrum and transmits control information to the satellite zone players identifying the newly selected channel.

Figure 13:
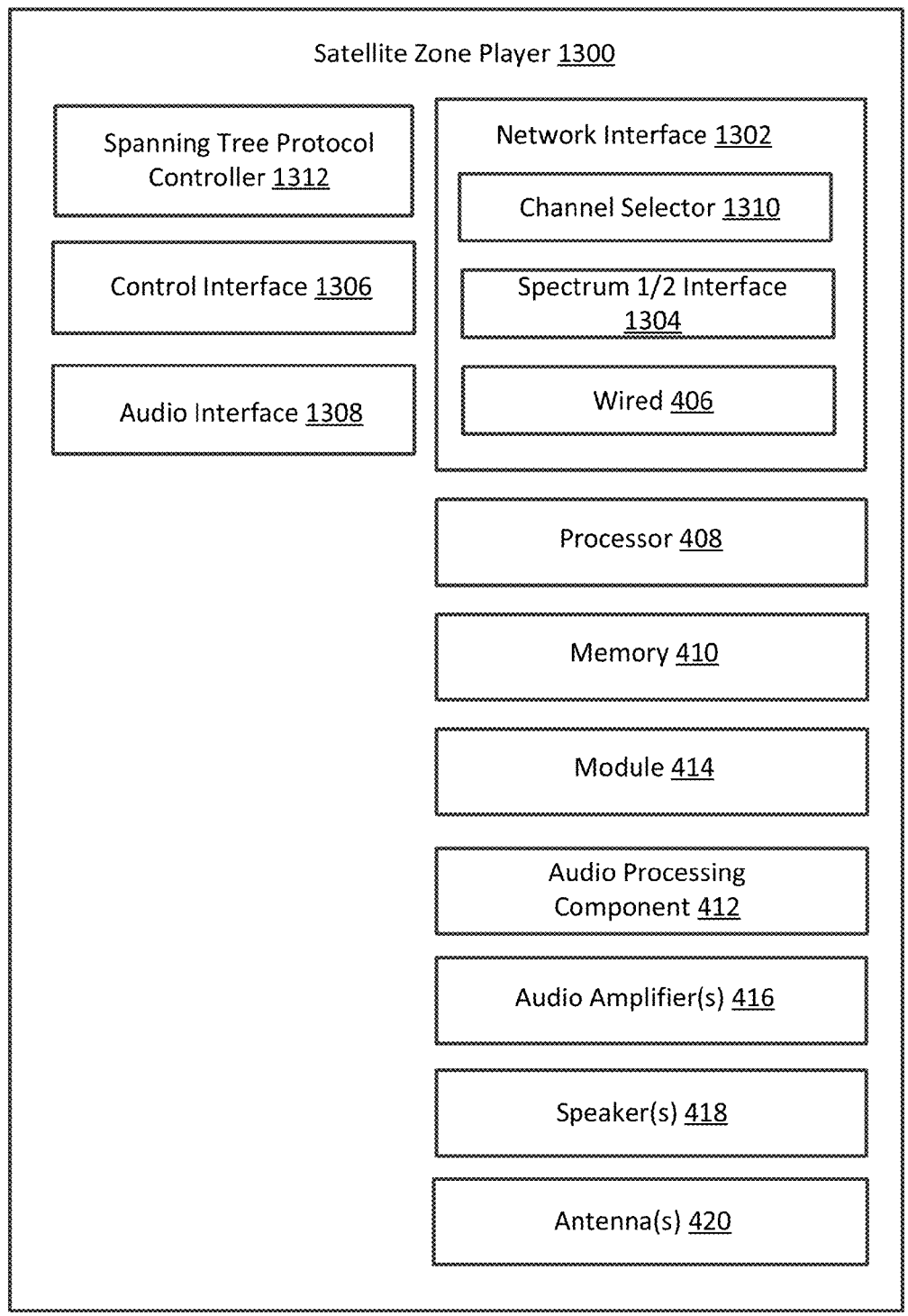
FIG. 13 shows an internal functional block diagram of a satellite zone player to provide low-latency audio in combination with the primary zone player of FIG. 12.

FIG. 13 shows an internal functional block diagram of an example satellite zone player 1300 to provide low-latency audio in combination with the example primary zone player 1200 of FIG. 12. The example satellite zone player 1300 of FIG. 13 may be used to implement any of the example zone players 102-124 of FIG. 1 and/or the playback devices 704 in FIG. 7. In some embodiments, the example primary zone player 1200 may be used to implement any of the home theater zone players 116, 118, 120 and/or may be satellite speakers (e.g., left/right surround speakers, subwoofers, etc.) to complement a sound bar-type surround sound configuration.

Like the example zone player 400 of FIG. 4 and the example primary zone player 1200 of FIG. 12, the example satellite zone player 1300 of FIG. 13 includes a processor 408, memory 410, an audio processing component 412, a module 414, an audio amplifier 416, speakers 418, and one or more antenna(s) 420. These components are discussed in detail above. More or less components may be included depending on the desired configuration. The example satellite zone player 1300 of FIG. 13 includes a network interface 1302 having a dual spectrum interface 1304 (Spectrum 1/2 interface) to communicate via a first wireless spectrum (e.g., the 2.4 GHz spectrum) and a second wireless spectrum different from the first wireless spectrum (e.g., the 5 GHz spectrum), and a wired interface 406. The wired interface 406 is discussed above.

In the examples of FIGS. 12 and 13, the dual spectrum interface 1304 communicates in the same two spectra as the first and second wireless interfaces 1204, 1206. The example dual spectrum interface 1304 may communicate in either the first spectrum (e.g., on a wireless channel in the first spectrum) or the second spectrum (e.g., on a wireless channel in the second spectrum) at a given time. In some other examples, the dual spectrum wireless interfaces 1204, 1206 may communicate in both spectra simultaneously or substantially simultaneously. In some examples, the dual spectrum interface 1304 is replaced with separate first and second wireless interfaces, which may be similar or identical to the first and second wireless interfaces 1204, 1206 of FIG. 12. In some embodiments, each wireless interface is assigned a unique address (e.g., a MAC address).

The example satellite zone player 1300 of FIG. 13 further includes a control interface 1306 and an audio interface 1308. The control interface 1306 and the audio interface 1308 transmit and/or receive information (e.g., control information, audio information) via the dual spectrum interface 1304 and/or the wired interface 406. The example control interface 1306 receives control information via a channel (e.g., from the primary zone player 1200 of FIG. 12) in a first spectrum (e.g., Spectrum 1). The control information via the first spectrum indicates an audio channel in a second spectrum (e.g., Spectrum 2) via which audio information in addition to control information is to be transmitted to the satellite zone player 1300 from the primary zone player 1200. The example control interface 1306 also transmits control information, such as probe acknowledgements, configuration information, device information, and/or other information used for control and/or configuration of the satellite zone player 1300 to a primary zone player 1200 and/or to standard zone players.

The example audio interface 1308 of FIG. 13 receives audio information to be played (e.g., via the speakers 418). The audio information may be received via an audio channel via which the dual spectrum interface 1304 is communicating. In some examples, the audio interface 1308 determines that the received audio information has a high quality of service characteristic and/or a low latency, indicating that the audio is to be played as soon as possible and/or at a designated time.

The example network interface 1302 of FIG. 13 further includes a channel selector 1310. The example channel selector 1310 selects a wireless communications channel in the first spectrum or the second spectrum and causes the dual spectrum interface 1304 to begin communicating on the selected channel.

In some examples, the control interface 1306 may receive a notification from a primary zone player that communication is to be changed to a different channel in the second spectrum (e.g., the 5 GHz spectrum). This may occur if, for example, the channel being used has become unsuitable for low-latency audio and another, more suitable channel is available. The example control interface 1306 provides the new channel to the channel selector 1310, which causes the dual spectrum interface 1304 to change channels within the same spectrum. In some examples, the control interface 1306 may receive a notification from a primary zone player that communication is to be changed to a channel in the first spectrum (e.g., the 2.4 GHz spectrum). This may occur if, for example, the channel being used has become unsuitable for low-latency audio and no other more suitable channel is available in the second spectrum (e.g., 5 GHz spectrum). The example control interface 1306 provides the channel to the channel selector 1310, which causes the dual spectrum interface 1304 to change channels and spectrum.

The example satellite zone player 1300 further includes a spanning tree protocol controller 1312 to control a spanning tree protocol configuration based on receiving control information (e.g., from a primary zone player). For example, a spanning tree protocol configuration may be a spanning tree protocol table (e.g., stored in the memory 410) that includes the ports and/or devices to which the example satellite zone player 1300 is connected. The example spanning tree protocol controller 1312 reconfigures the spanning tree protocol table when additional zone players are added and/or when configurations of the satellite zone player 1300 changes. For example, the spanning tree protocol controller 1312 changes the spanning tree protocol table when the satellite zone player 1300 is reconfigured to connect to a primary zone player in a different networking mode (e.g., reconfigured from a mesh networking mode to a star networking mode).

Figure 14:
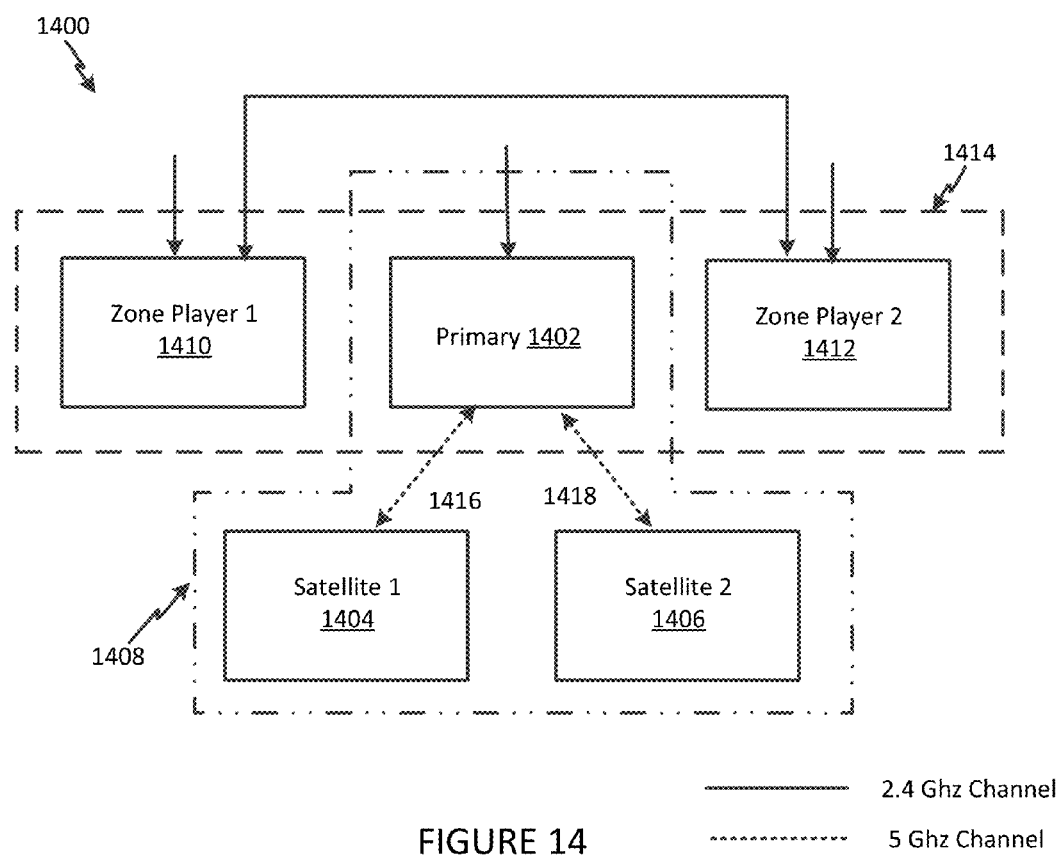
FIG. 14 shows a block diagram of an example zone player network in which a primary zone player is connected to satellite players in a star network and to additional zone players via a mesh network.

FIG. 14 shows a block diagram of an example zone player network 1400 in which a primary zone player 1402 is connected to satellite zone players 1404, 1406 via a star network 1408 and to additional zone players 1410, 1412 via a mesh network 1414. The example primary zone player 1402 and the example satellite zone players 1404, 1406 may be configured in a home theater arrangement in a single location (e.g., in the same room). The example zone players 1410, 1412 may be located in the same or different rooms from the example primary and/or satellite zone players 1402-1406. In an embodiment, the zone player network 1400 is like the network 700 in FIG. 7, where the primary zone player 1402 is like the playback device 702, the satellite zone players 1404, 1406 are like the playback devices 704, and the additional zone players 1410, 1412 are like playback devices 706. Additionally, in the embodiment, the star network 1408 is like the HT network 718 in FIG. 7 and the mesh network 1414 is like the ZG network 720.

The example primary zone player 1402 and the zone players 1410, 1412 are communicatively coupled via a first spectrum (e.g., a 2.4 GHz spectrum channel). The example zone players 1402, 1410, 1412 in the mesh network 1414 may communicate and/or synchronize audio information and/or control information as described in U.S. Pat. No. 8,234,395, entitled, "System and method for synchronizing operations among a plurality of independently clocked digital data processing devices," the entirety of which is hereby incorporated by reference. At the direction of a user, additional zone players may be added to and/or removed from the mesh network 1414; any of the zone players 1402, 1410, 1412 may be removed from and/or rejoined to the mesh network 1414; and/or any combination of the primary zone player 1402, the zone player 1410, and/or the zone player 1412 may be grouped into zone groups for synchronized playback of audio. In the example of FIG. 14, a user may choose to cause audio provided to the primary zone player 1402 that is part of a zone group with one or more of the zone player(s) 1410, 1412 to also be played via the satellite zone players 1404, 1406 in the star network 1408.

In the example of FIG. 14, in which the primary zone player 1402 is coupled via respective star wireless connections 1416, 1418 to the satellite zone players 1404, 1406. The establishment of the example connections 1416, 1418 is described in more detail below. The example primary zone player 1402 and the satellite zone players 1404, 1406 are communicatively coupled via a second spectrum (e.g., a 5 GHz spectrum channel). The satellite zone players 1404, 1406 may be, for example, left and right rear surround speakers such as the Sonos PLAY:3™ zone player. In some examples, one or more of the satellite zone players 1404, 1406 is a subwoofer zone player such as the Sonos SUB zone player.

The primary zone player 1402 receives audio information from an audio source (e.g., a television, a networked source, an Internet source, via the zone player(s) 1410, 1412, etc.) to be played via the star network 1408. The example primary zone player 1402 determines the audio information to be transmitted to respective ones of the example satellite zone players 1404, 1406. For example, the Dolby® Digital family of surround sound technology provides for audio channels corresponding to surround (e.g., rear) speakers. The primary zone player 1402 transmits, via the second spectrum (e.g., 5 GHz spectrum) audio channel, the respective audio information to the satellite zone players 1404, 1406, which decode and play the audio information. In an embodiment, the primary zone player 1402 includes timing information along with the audio information to the satellite zone players 1404, 1406.

In the example of FIG. 14, the primary zone player 1402 assigns different quality of service indicators to different types of information. For example, the primary zone player 1402 may assign the highest quality of service (e.g., quality of service level 3) to audio information requiring a low latency (e.g., less than a threshold latency) that is transmitted to the satellite zone players 1404, 1406. The primary zone player 1402 may assign a next highest quality of service (e.g., quality of service level 2) to audio information from one or more predetermined types of sources (e.g., a wired source, a home theater source, etc.) that is not transmitted to a satellite zone player (e.g., is transmitted to the zone players 1410, 1412). The example primary zone player 1402 assigns a next highest quality of service (e.g., quality of service level 1) to audio information from other types of sources (or any source, if quality of service level 2 is not used) that is not transmitted to a satellite zone player (e.g., is transmitted to the zone players 1410, 1412). The example primary zone player 1402 uses the lowest quality of service (e.g., quality of service level 0) to transmit background data (e.g., non-audio information, control information, configuration information, etc.) to other zone players (e.g., zone players 1404, 1406, 1410, 1412). The use of quality of service enables the star network 1408 to provide low-latency audio, which improves user perception of a home theater presentation and reduces lag between video and audio to acceptable levels.

The description discloses various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

Additionally, reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

We claim:
1. A method comprising:
    detecting, by a first device, a plurality of home theater players and a zone group including one or more players;
    receiving an audio signal at the first device from an audio source;
    identifying, by the first device, home theater audio information contained in the audio signal for playback by the plurality of home theater players;
    identifying, by the first device, zone group audio information contained in the audio signal for playback by one or more players in the zone group;
    assigning, by the first device based on the detection of the plurality of home theater players and the identification of the home theater audio information, at least one home theater timestamp to the home theater audio information that indicates a time at which audio is to be played by the plurality of home theater players, wherein one or more of the at least one home theater timestamp is assigned based on a first delay defined for at least one of the plurality of the home theater players;
    assigning, by the first device based on the detection of the zone group and the identification of the zone group audio information, a zone group timestamp to the zone group audio information that indicates a time at which audio is to be played by the one or more players in the zone group, wherein the zone group timestamp is assigned based on a second delay, wherein the second delay is defined for the zone group and is different from the first delay; and sending, from the first device, the home theater audio information with the one or more home theater timestamps to the plurality of home theater players and sending the zone group audio information with the zone group timestamp to the one or more players in the zone group.

2. The method of claim 1, wherein the first device is a playback device.

3. The method of claim 1, wherein the audio source is a video device.

4. The method of claim 1, further comprising determining whether the first device is coupled to the plurality of home theater players.

5. The method of claim 1, further comprising determining whether the first device is part of the zone group.

6. The method of claim 1, further comprising separating the home theater audio information and the zone group audio information into different audio channels and assigning a timestamp to each different audio channel.

7. The method of claim 1, further comprising assigning home theater audio information to a high priority queue at the home theater players to be processed before the zone group audio information.

8. The method of claim 1, wherein the home theater audio information is sent to the plurality of home theater players using a first wireless channel and the zone group audio information is sent to the one or more players in the zone group over a second wireless channel that is different from the first wireless channel.

9. The method of claim 8, wherein the first wireless channel comprises a low-latency network.

10. The method of claim 1, further comprising adjusting, in response to a received command, the zone group timestamp and the one or more home theater timestamps, wherein the zone group timestamp is adjusted differently than the one or more home theater timestamps.

11. A tangible, non-transitory machine-readable medium having instructions stored thereon that, when executed, cause a first device to at least:
    detect, by the first device, a plurality of home theater players and a zone group including one or more players;
    receive an audio signal at the first device from an audio source;
    identify, by the first device, home theater audio information contained in the audio signal for playback by the plurality of home theater players;
    identify, by the first device, zone group audio information contained in the audio signal for playback by one or more players in the zone group;
    assign, by the first device based on the detection of the plurality of home theater players and the identification of the home theater audio information, at least one home theater timestamp to the home theater audio information that indicates a time at which audio is to be played by the plurality of home theater players, wherein one or more of the at least one home theater timestamp is assigned based on a first delay defined for at least one of the plurality of the home theater players;
    assign, by the first device based on the detection of the zone group and the identification of the zone group audio information, a zone group timestamp to the zone group audio information that indicates a time at which audio is to be played by the one or more players in the zone group, wherein the zone group timestamp is assigned based on a second delay, wherein the second delay is defined for the zone group and is different from the first delay; and
    send, from the first device, the home theater audio information with the one or more home theater timestamps to the plurality of home theater players and send the zone group audio information with the zone group timestamp to the one or more players in the zone group.

12. The tangible, non-transitory machine-readable medium as defined in claim 11, wherein the first device is a playback device.

13. The tangible, non-transitory machine-readable medium as defined in claim 11, wherein the audio source is a video device.

14. The tangible, non-transitory machine-readable medium as defined in claim 11, wherein the instructions further cause the first device to determine whether the first device is coupled to the plurality of home theater players.

15. The tangible, non-transitory machine-readable medium as defined in claim 11, wherein the instructions further cause the first device to determine whether the first device is part of the zone group.

16. The tangible, non-transitory machine-readable medium as defined in claim 11, wherein the instructions further cause the first device to separate the home theater audio information and the zone group audio information into different audio channels and assign a timestamp to each different audio channel.

17. The tangible, non-transitory machine-readable medium as defined in claim 11, wherein the instructions further cause the first device to assign home theater audio information to a high priority queue at the home theater players to be processed before the zone group audio information.

18. The tangible, non-transitory machine-readable medium as defined in claim 11, wherein the home theater audio information is sent to the plurality of home theater players using a first wireless channel and the zone group audio information is sent to the one or more players in the zone group over a second wireless channel that is different from the first wireless channel.

19. The tangible, non-transitory machine-readable medium as defined in claim 18, wherein the first wireless channel comprises a low-latency network.

20. The method of claim 1, further comprising comparing a selected first channel to a second channel and, if the second channel better satisfies a low-latency criterion when compared to the first selected channel, sending the home theater audio information with the one or more home theater timestamps to the plurality of home theater players via the second channel.

21. A first device comprising:
    at least one processor;
    tangible, non-transitory computer-readable media having instructions stored therein, wherein the instructions, when executed by the at least one processor, cause the first device to perform a method comprising:
    detecting a plurality of home theater players and a zone group including one or more players;
    receiving an audio signal from an audio source;
    identifying home theater audio information contained in the audio signal for playback by the plurality of home theater players;
    identifying zone group audio information contained in the audio signal for playback by one or more players in the zone group;

based on the detection of the plurality of home theater players and the identification of the home theater audio information, assigning at least one home theater timestamp to the home theater audio information that indicates a time at which audio is to be played by the plurality of home theater players, wherein one or more of the at least one home theater timestamp is assigned based on a first delay defined for at least one of the plurality of the home theater players;

based on the detection of the zone group and the identification of the zone group audio information, assigning a zone group timestamp to the zone group audio information that indicates a time at which audio is to be played by the one or more players in the zone group, wherein the zone group timestamp is assigned based on a second delay, wherein the second delay is defined for the zone group and is different from the first delay; and sending the home theater audio information with the one or more home theater timestamps to the plurality of home theater players and sending the zone group audio information with the zone group timestamp to the one or more players in the zone group.

22. The first device of claim 21, wherein the first device is a playback device.

23. The first device of claim 21, wherein the audio source is a video device.

24. The first device of claim 21, wherein the method further comprises:
determining whether the first device is coupled to the plurality of home theater players.

25. The first device of claim 21, wherein the method further comprises:
determining whether the first device is part of the zone group.

26. The first device of claim 21, wherein the method further comprises:
separating the home theater audio information and the zone group audio information into different audio channels and assigning a timestamp to each different audio channel.

27. The first device of claim 21, wherein the method further comprises:
assigning home theater audio information to a high priority queue at the home theater players to be processed before the zone group audio information.

28. The first device of claim 21, wherein the home theater audio information is sent to the plurality of home theater players using a first wireless channel and the zone group audio information is sent to the one or more players in the zone group over a second wireless channel that is different from the first wireless channel.

29. The first device of claim 28, wherein the first wireless channel comprises a low-latency network.

30. The first device of claim 21, wherein the method further comprises:
adjusting, in response to a received command, the zone group timestamp and the one or more home theater timestamps, wherein the zone group timestamp is adjusted differently than the one or more home theater timestamps.

31. The first device of claim 21, wherein the method further comprises:
comparing a selected first channel to a second channel and, if the second channel better satisfies a low-latency criterion when compared to the first selected channel, sending the home theater audio information with the one or more home theater timestamps to the plurality of home theater players via the second channel.

* * * * *